(12) United States Patent
Kainoh et al.

(10) Patent No.: US 7,435,001 B2
(45) Date of Patent: Oct. 14, 2008

(54) HYDRODYNAMIC BEARING DEVICE, METHOD FOR MANUFACTURING THE SAME, SPINDLE MOTOR AND RECORDING AND REPRODUCTION APPARATUS

(75) Inventors: Naoshi Kainoh, Ehime (JP); Akihito Shirai, Ehime (JP); Shigeo Obata, Hyogo (JP); Youichi Nishimoto, Ehime (JP); Junichi Nakamura, Ehime (JP); Tomohiro Haga, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 320 days.

(21) Appl. No.: 11/443,015

(22) Filed: May 31, 2006

(65) Prior Publication Data

US 2007/0147715 A1    Jun. 28, 2007

(30) Foreign Application Priority Data

Dec. 26, 2005    (JP)    ............................. 2005-373028

(51) Int. Cl.
*F16C 32/06*    (2006.01)

(52) U.S. Cl. ..................... 384/100; 384/107; 384/110

(58) Field of Classification Search ................ 348/100, 348/107, 110, 114, 132; 360/99.08, 98.07
See application file for complete search history.

(56) References Cited

U.S. PATENT DOCUMENTS

| | | | | |
|---|---|---|---|---|
| 5,423,612 A | * | 6/1995 | Zang et al. | 384/132 |
| 5,765,952 A | * | 6/1998 | Dekker et al. | 384/107 |
| 6,066,903 A | * | 5/2000 | Ichiyama | 384/107 |
| 6,246,136 B1 | * | 6/2001 | Ichiyama | 384/107 |
| 6,787,954 B2 | * | 9/2004 | Yoshitsugu et al. | 360/99.08 |
| 7,201,516 B2 | * | 4/2007 | Haga | 384/100 |
| 2004/0107577 A1 | * | 6/2004 | Hayashi et al. | 29/898.02 |
| 2004/0132881 A1 | * | 7/2004 | Okamiya et al. | 384/100 |

FOREIGN PATENT DOCUMENTS

| | | |
|---|---|---|
| JP | 2001-248645 | 9/2001 |
| JP | 2001-304263 | 10/2001 |
| JP | 2003-65336 | 3/2003 |
| JP | 2004-263814 | 9/2004 |

* cited by examiner

*Primary Examiner*—Thomas R Hannon
(74) *Attorney, Agent, or Firm*—Wenderoth, Lind & Ponack, L.L.P.

(57) ABSTRACT

A hydrodynamic bearing device which can improve workability of injecting a lube repellant and effectively prevent leakage of a lubricant, a method for manufacturing the same, a spindle motor, and a recording and reproduction apparatus are provided. A hydrodynamic bearing device 4 includes a lube repellant 11a which is applied in a circular shape by a predetermined distance in a radial direction from a portion of an upper surface of a second thrust flange 41c where it is connected to a shaft 41 and a lube repellant 11b which is applied in a circular shape on an outer peripheral surface of the second thrust flange 41c below from an upper end in the radial direction by a predetermined distance. The lube repellant 11b is applied near the upper end portion in a gap formed between the outer peripheral surface of the second thrust flange 41c and an inner peripheral surface of an outer sleeve 44.

19 Claims, 18 Drawing Sheets

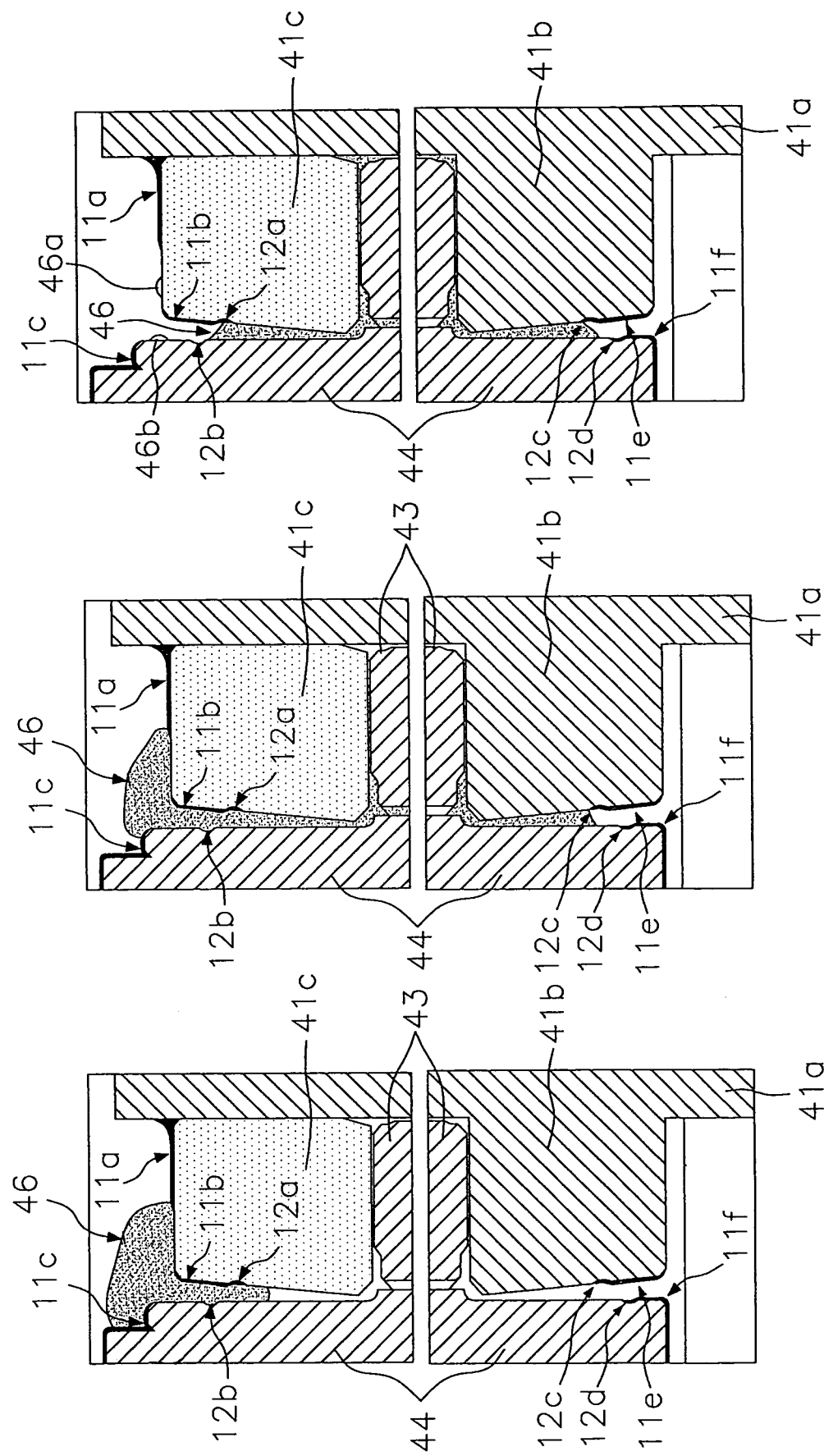

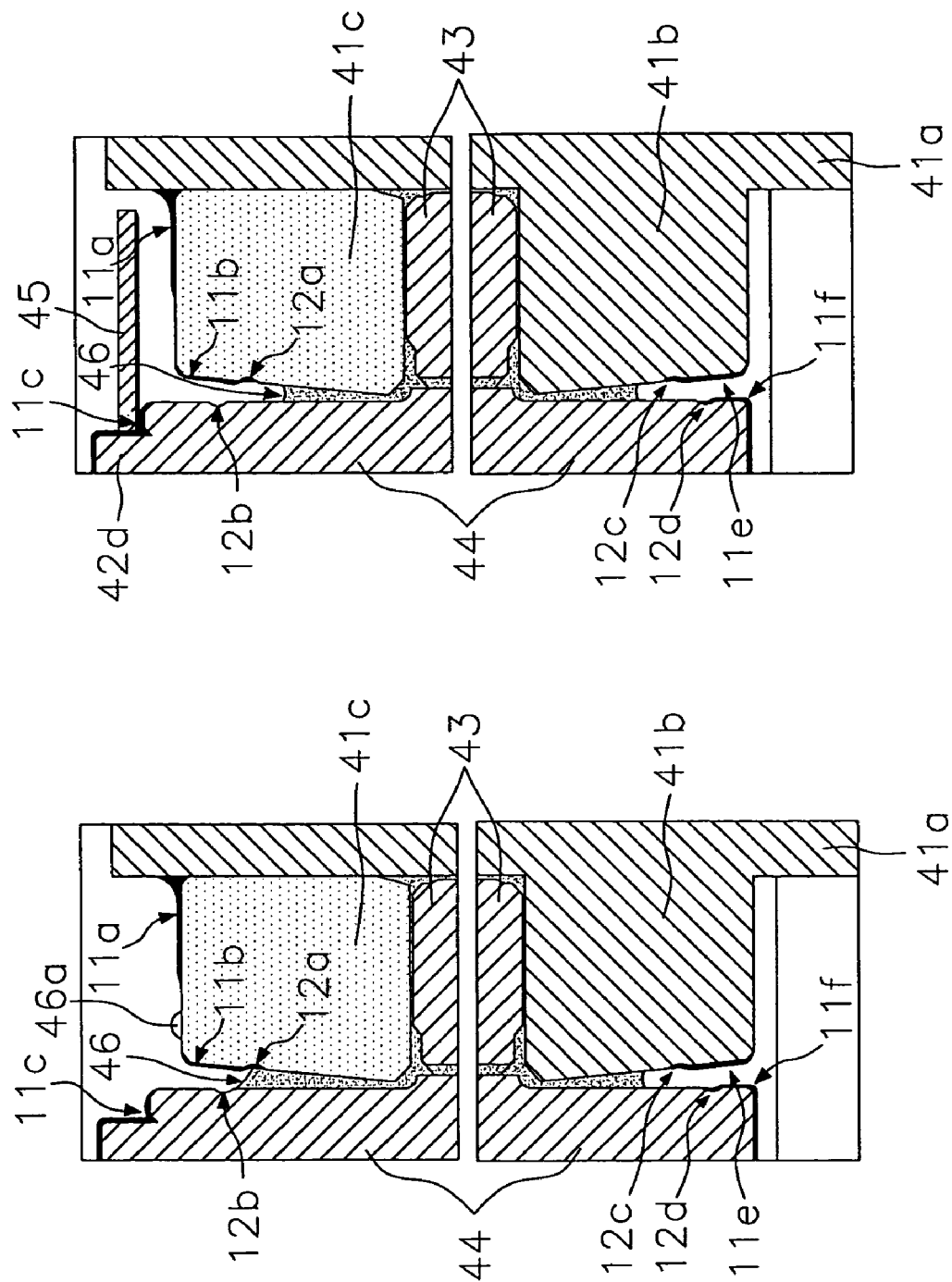

HYDRODYNAMIC BEARING DEVICE, METHOD FOR MANUFACTURING THE SAME, SPINDLE MOTOR AND RECORDING AND REPRODUCTION APPARATUS

TECHNICAL FIELD

The present invention relates to a dynamic pressure fluid bearing to be incorporated into a hard disc drive apparatus and the like and a method for manufacturing the same, a spindle motor, and a recording and reproduction apparatus.

BACKGROUND ART

In recent years, a spindle motor to be incorporated into a disc drive device, such as a hard disc drive device (hereinafter, referred to as HDD) employs a dynamic pressure fluid bearing (hereinafter, referred to as fluid bearing) which can realize low non-repetitive run out (NRRO) and low noise by non-contact rotation.

The fluid bearing has a structure that a fluid (hereinafter, referred to as a lubricant) is filled between a stationary portion and a rotating portion. In order to achieve an operation with a high precision, it is important to prevent leakage and evaporation of the lubricant.

In general, in such a fluid bearing, a seal mechanism is provided on an opening end in order to prevent leakage of the lubricant from the opening end. One of the seal mechanisms is to provide a tapered structure in an upper part of the rotating portion in an axial direction to form a gap between the fixed portion and the rotation portion into a tapered shape which becomes wider as it extends from the inner side of the bearing toward outside. This is effective not only in preventing the leakage of the lubricant by utilizing a surface tension of the lubricant, but also in facilitating filling the gap with the lubricant by utilizing a capillary phenomenon when the lubricant is injected.

Meanwhile, if the fluid bearing is left under a high temperature, for example, the lubricant may be leaked out. In such a case, if the temperature of the lubricant rises, and a surface area of the lubricant becomes large as it leaked out, the rate of evaporation of the lubricant increases, and the lubricant evaporates rapidly. Therefore, in general, a lube repellant is applied to a portion near the bearing opening end in order to prevent leakage of the lubricant which may result in speeding up evaporation of the lubricant.

In order to more effectively achieve the effects of the seal mechanism and the lubricant (hereinafter, referred to as sealing function), various types of fluid bearings have been proposed.

Examples include: a structure in which a wide groove for applying a lube repellant is provided on a lower surface of a hub (see Japanese Laid-Open Publication No. 2001-248645); a structure in which a lube repellant is applied to a sleeve and an upper end portion of a shaft (see Japanese Laid-Open Publication Nos. 2001-304263 and 2004-263814); a structure in which a concave portion or a convex portion is provided on a tapered structure to define a position to apply a lube repellant (see Japanese Laid-Open Publication No. 2003-65336); and the like.

DISCLOSURE OF THE INVENTION (Problems to be Solved by the Invention)

However, the conventional fluid bearings mentioned above have following problems.

Since it is difficult to apply the lube repellant precisely to the inside of a minute fluid bearing, the lube repellant may attach to portions other than a predetermined portion or may leak out to contaminate the inside of the fluid bearing. If the lube repellant is not precisely applied to a predetermined portion, leakage and/or evaporation of the lubricant cannot be effectively prevented, and also, precise injection of oil becomes difficult.

Furthermore, since the lubricant is injected into a minute space, oil can only be injected little by little, and thus, time for injection becomes long.

An object of the present invention is to provide a hydrodynamic bearing device and a method for manufacturing the same, a spindle motor, and a recording and reproduction apparatus which can improve workability in injecting the lube repellant and also effectively prevent leakage of the lubricant.

(Means for Solving the Problems)

A hydrodynamic bearing device of the first invention comprises a fixed portion, a rotating portion, a lubricant, a dynamic pressure bearing portion, a first gap portion, a first surface portion, a first lube repellant and a second lube repellant. The rotating portion rotates with respect to the fixed portion. The lubricant is to be filled in a gap formed between the rotating portion and the fixed portion. The dynamic pressure bearing portion supports the rotating portion so as to be rotatable with respect to the fixed portion with the lubricant interposed therebetween. The first gap portion is provided in an upper portion of the rotating portion in an axial direction and is formed between the rotating portion and the fixed portion. The first surface portion is formed on either a part of the rotating portion or a part of the fixed portion which form the first gap portion in a position above the first gap portion in the axial direction. The first lube repellant is applied on the first surface portion in a circular shape with a space of a predetermined distance in a radial direction from an outer edge of the gap portion. The second lube repellant is applied in a circular shape on either the rotation portion or the fixed portion at a position closer to an outer edge of the gap than the first surface portion within the first gap.

With this structure, for injecting a lubricant, the lubricant is injected between the first lube repellant applied on the first surface in a circular shape and the first gap portion, thereby preventing the lubricant from spilling over in a direction further from the first gap portion than the first lube repellant during injection. Thus, a large amount of lubricant can be injected at one time and can be guided toward the first gap portion efficiently. Further, a remaining lubricant on the first surface portion after injection of the lubricant between the first lube repellant and the first gap portion remains only at a particular position on the first surface portion (between the first and the second lube repellants). Thus, an operation to wipe off can be efficiently performed.

Moreover, leakage of the lubricant injected into the first gap portion from the first gap portion can be suppressed by the second lube repellant applied near an outer edge of the first gap portion.

As a result, while being able to perform injection operations efficiently by injecting lubricant into the predetermined position between the 1st and the 2nd lube repellants, it becomes also possible to suppress the leakage of the lubricant after injection.

The expression "upper portion" refers to the upside when the lubricant is being applied. It may be changed depending upon along which direction the hydrodynamic bearing device is used after the lubricant is inside.

A hydrodynamic bearing device of the second invention is a hydrodynamic bearing device of the first invention, in which the first gap portion formed between the rotating portion and the fixed portion has a tapered shape with at least a part of the gap which becomes wider toward outside the dynamic pressure bearing portion.

With this structure, the lubricant injected between the first lube repellant and the first gap portion is guided to a further end of the gap by a capillary phenomenon produced by the first gap portion having a tapered shape. As a result, the lubricant can be easily filled from the first gap portion to the gap forming the dynamic pressure generating portion by only injecting the lubricant into a predetermined injection position.

A hydrodynamic bearing device of the third invention is a hydrodynamic bearing device of the first invention; further comprising a second gap portion provided in a lower portion in the axial direction and is formed between the fixed portion and the rotating portion. The second gap portion has a tapered shape with at least part of the gap which becomes wider toward outside the dynamic pressure bearing portion.

With this structure, similarly to the first gap portion the lubricant which exists on the wider side of the gap in the second gap portion can be guided to the smaller side of the gap by the capillary phenomenon. As a result, the lubricant can be easily filled to the gap corresponding to the dynamic pressure generating portion A hydrodynamic bearing device of the fourth invention is a hydrodynamic bearing device of the third invention, in which third lube repellant is applied in a circular shape in a lower portion of the second gap portion.

With this structure, the lubricant filled in the gap formed within the hydrodynamic bearing device can be suppressed from leaking outside the second gap portion.

Similarly to the expression "upper portion" as described above, the expression "lower portion" refers to a lower side at injection.

A hydrodynamic bearing device of the fifth invention is a hydrodynamic bearing device according to the fourth invention, in which an angle between at least one application surface from the first lube repellant through the third lube repellant and a non application surface is larger than an angle of contact between the lube repellant and the application surface when the lube repellant is in a liquid state.

With this structure, leakage of the lubricant from the non-application surface across the application surface can be effectively suppressed by forming the boundary between the application surface and the non-application surface of the first through third lube repellants so as to satisfy the above relationship.

A hydrodynamic bearing device of the sixth invention is a hydrodynamic bearing device according to the first invention, in which a circular groove is formed on at least one of the rotating portion and the fixed portion in the first gap portion, and the second lube repellant is applied to a portion which includes an outer edge of the first gap portion and is continuous to the circular groove or an upper edge of the circular groove in the axial direction.

With this structure, the second lube repellant applied in the first gap portion extends from the outside the first gap portion to a position adjacent to the circular groove, or to inside the circular groove. Thus, the effect of suppressing leakage of the lubricant by combining the lube repellant and the circular groove can be further enhanced.

A hydrodynamic bearing device of the seventh invention is a hydrodynamic bearing device of the sixth invention, in which the circular grooves are formed on both of the fixed portion and the rotating portion, and the circular grooves are formed on positions so as not to oppose each other.

With this structure, even when the hydrodynamic bearing device is subjected to a rapid decompression with the lubricant filled in the circular groove portions, remaining of a bubble in the circular groove can be suppressed. As a result, the lubricant can be prevented from leaking out due to a rise of the liquid surface caused by a bubble in the lubricant.

A hydrodynamic bearing device of the eighth invention is a hydrodynamic bearing device of the fourth invention, in which a circular groove is formed in the second gap portion and the third lube repellant is applied to a portion from outside of the second gap portion to the circular groove or to outside of the circular groove in the axial direction.

With this structure, the third lube repellant applied in the second gap portion extends from the outside the second gap portion to a position adjacent to the circular groove, or to inside the circular groove. Thus, the effect of suppressing leakage of the lubricant by combining the lube repellant and the circular groove can be further enhanced.

A hydrodynamic bearing device of the ninth invention is a hydrodynamic bearing device according to the first invention, further comprising a second surface portion and a fourth lube repellant. The second surface portion is positioned above the first gap portion, and is formed on either a part of the rotating portion or a part of the fixed portion which form the first gap portion. The fourth lube repellant is applied in a circular shape on the second surface portion at a position spaced apart from the first surface portion toward upper portion in the axial direction.

With this structure, leakage of the lubricant can be suppressed in a direction toward the opposite side of the first surface portion in the radial direction when viewed from the first gap portion.

A hydrodynamic bearing device of the tenth invention is a method for manufacturing a hydrodynamic bearing device according to the first invention, in which the lubricant is supplied to between the first lube repellant and the first gap portion under a decompressed condition, and the lubricant is made to permeate under a condition of a pressure higher than the decompressed condition.

With this structure, the lubricant can be injected efficiently between the first lube repellant applied on the first surface portion and the first gap portion.

A spindle motor of the eleventh invention comprises a hydrodynamic bearing device according to the first invention.

A hydrodynamic bearing device of the twelfth invention includes a spindle motor according to the eleventh invention.

A hydrodynamic bearing device of the thirteenth invention comprises a fixed portion, a rotating portion, a lubricant, a dynamic pressure bearing portion, a seal surface, and a non-seal surface. The rotating portion rotates with respect to the fixed portion. The lubricant is filled in a gap formed between the rotating portion and the fixed portion. The dynamic pressure bearing portion supports the rotating portion so as to be rotatable with respect to the fixed portion with the lubricant interposed therebetween. The seal surface is positioned above the dynamic pressure bearing portion and is formed on at least one of the rotating portion and the fixed portion. A lube repellant is applied to the non-seal surface which is positioned to continue from the seal surface at a position above the seal surface. The lube repellant has a viscosity of 80 mPa·S or smaller at 25° C. in a liquid state before curing. An angle formed by the seal surface and the non-seal surface is larger than an angle of contact of the lube repellant with the non-seal surface when the lube repellant is in a liquid state before curing, and is 60 degrees or smaller.

With this structure, the seal surface and the non-seal surface are formed to satisfy the above relationship and the positions to apply the lube repellants are precisely controlled, allowing the movement of the lubricant from the position of the lube repellant to outside the bearing can be effectively suppressed. Thus, it becomes possible that the lube repellant is applied near the liquid surface of the lubricant. Thus, leakage of the lubricant can be suppressed and a surface area of the lubricant can be suppressed in the circumstance of a high temperature to suppress the rate of evaporation of the lubricant.

Further, by setting the upper limit of the angle to 60 degrees, generation of burrs can be suppressed.

As a result, it becomes possible to avoid that life of the bearing is shortened due to evaporation of the lubricant and to prevent a burr from entering into the bearing portion.

A hydrodynamic bearing device of the fourteenth invention is a hydrodynamic bearing device of the thirteenth invention, in which a surface roughness of the seal surface is a maximum height Rz of 4.0 or smaller.

In general, if the surface roughness increases, the wettability of the surface of the lubricant also increases, and causes the lubricant to be spread more easily.

Thus, by setting the upper limit of the surface roughness on the seal surface, the movement of the lubricant from the seal surface to the non-seal surface can be suppressed without increasing the tapered angle by unnecessarily large amount.

As an indicator for surface roughness in this example, Rz representing the maximum height of a profile curve, which is defined by the JIS standards (JIS B 0601 and JIS B 0660), is used.

A hydrodynamic bearing device of the fifteenth invention is a hydrodynamic bearing device of the thirteenth invention, in which a circular groove which has one or more arc grooves having a cross-section radius of 50 μm or longer connected is formed on the seal surface; and the non-seal surface and the circular groove form one continuous surface.

With this structure, the arc groove having a cross-section radius of 50 μm or longer which is continuous to the non-seal surface is formed, and a bubble entered in the circular groove can be discharged out of the groove smoothly compared to a conventional rectangle groove. As a result, leakage of the lubricant due to entered bubble can be effectively reduced.

A hydrodynamic bearing device of the sixteenth invention is a hydrodynamic bearing device of the thirteenth invention, in which a circular groove which has one or more arc grooves having a cross-sectional radius of 50 μm or longer connected is formed on the non-seal surface, and the seal surface and the circular groove form one continuous surface.

With this structure, the arc groove having a cross-section radius of 50 μm or longer which is continuous to the seal surface is formed, and a bubble entered in the circular groove can be discharged out of the groove smoothly compared to a conventional rectangle groove. As a result, leakage of the lubricant due to entered bubble can be effectively reduced.

A hydrodynamic bearing device of the seventeenth invention is a hydrodynamic bearing device according to the thirteenth invention, in which a surface roughness of the non-seal surface is larger than a surface roughness of the seal surface.

In this way, the surface roughness of the seal surface is made smaller than that of the non-seal surface, and the wettability of lubricant in the seal surface can be made smaller than that of the non-seal surface. As a result, spreading of the lubricant on the seal surface can be suppressed to suppress evaporation of the lubricant.

A spindle motor of the eighteenth invention comprises a hydrodynamic bearing device according to the thirteenth invention.

A recording and reproduction apparatus of the nineteenth invention comprises a spindle motor of the eighteenth invention.

(Effects of the Invention)

According to the hydrodynamic bearing device of the present invention, for injecting a lubricant, the lubricant is injected to a predetermined position between the first and the second lube repellant to allow an efficient operation, and also, a leakage of the lubricant after injection can be suppressed.

BRIEF DESCRIPTION OF THE DRAWINGS

FIGS. 5A through 5C are enlarged views showing a flow of a process for injecting a lubricant to the hydrodynamic bearing device of FIG. 2.

FIGS. 6A and 6B are enlarged views showing a flow of a process for injecting the lubricant to the hydrodynamic bearing device of FIG. 2 after a step shown in FIG. 5C.

BEST MODE FOR CARRYING OUT THE INVENTION

Embodiment 1

A spindle motor 1 employing a hydrodynamic bearing device 4 which is a dynamic pressure fluid bearing according to the present embodiment will be described as follows with reference to FIGS. 1 through 10.

[An Entire Structure of the Spindle Motor 1]

Figure 1:
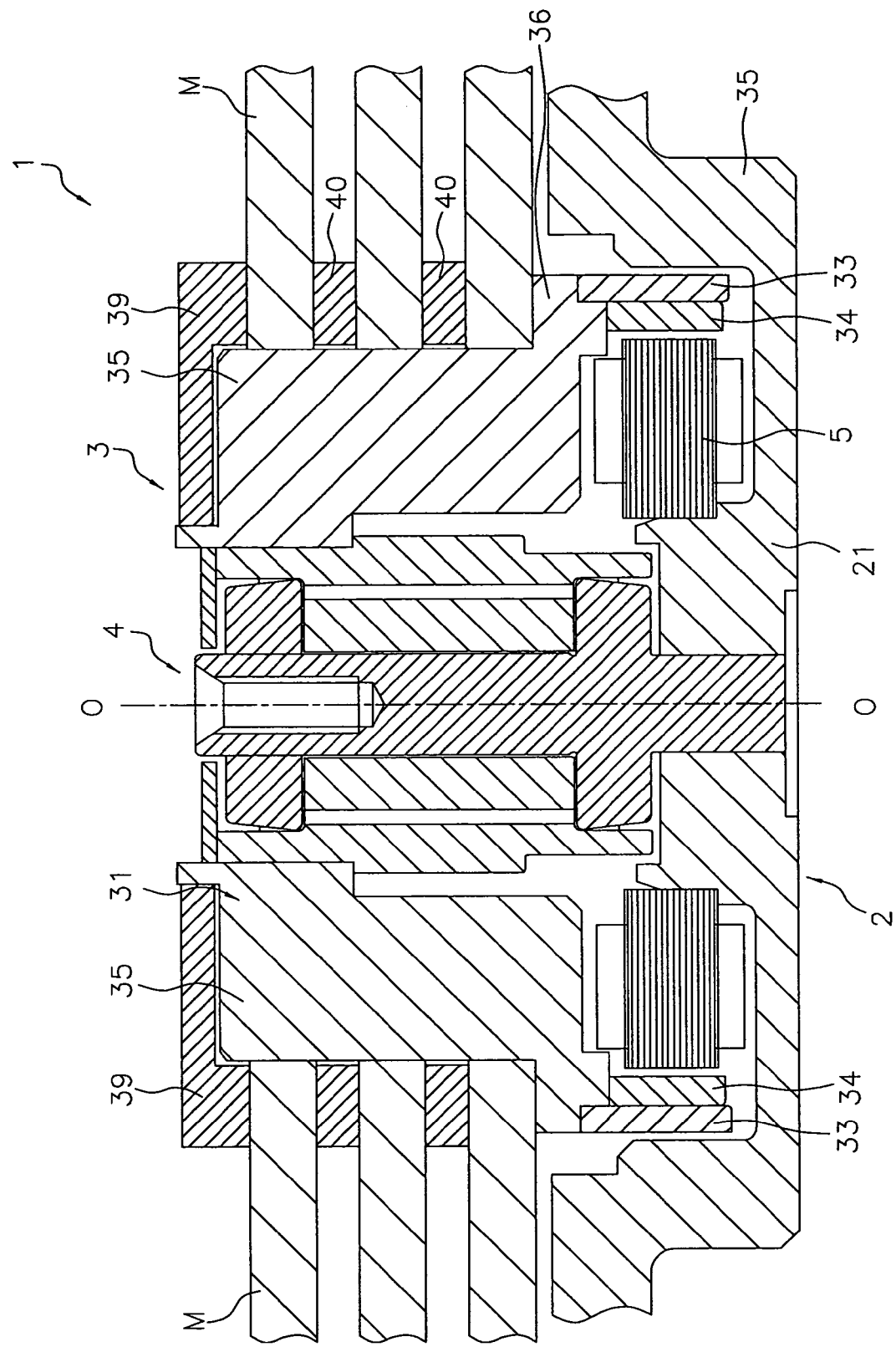
FIG. 1 is a cross-sectional view showing a structure of a spindle motor including a dynamic pressure fluid bearing according to an embodiment of the present invention.

As shown in FIG. 1, the spindle motor 1 includes, mainly, a base plate 2, a rotor 3, the hydrodynamic bearing device 4, and a stator 5. Line O-O shown in FIG. 1 is a rotational axis line of the spindle motor 1.

The base plate 2 forms a portion of a stationary part of the spindle motor 1 (fixed portion), and is a part of a housing of a recording disc device (recording and reproduction apparatus). The base plate 2 may be a separate member from the housing. The base plate 2 includes a tubular portion 21 and one end of a shaft 41 (see FIG. 2) of the hydrodynamic bearing device 4 is fixed to an inner periphery of the tubular portion 21.

The rotor 3 is a member of a rotating part of the spindle motor 1, and is driven to rotate by a rotating force generated by a magnetic circuit. The structure of the rotor 3 will be described below in more detail.

Figure 2:
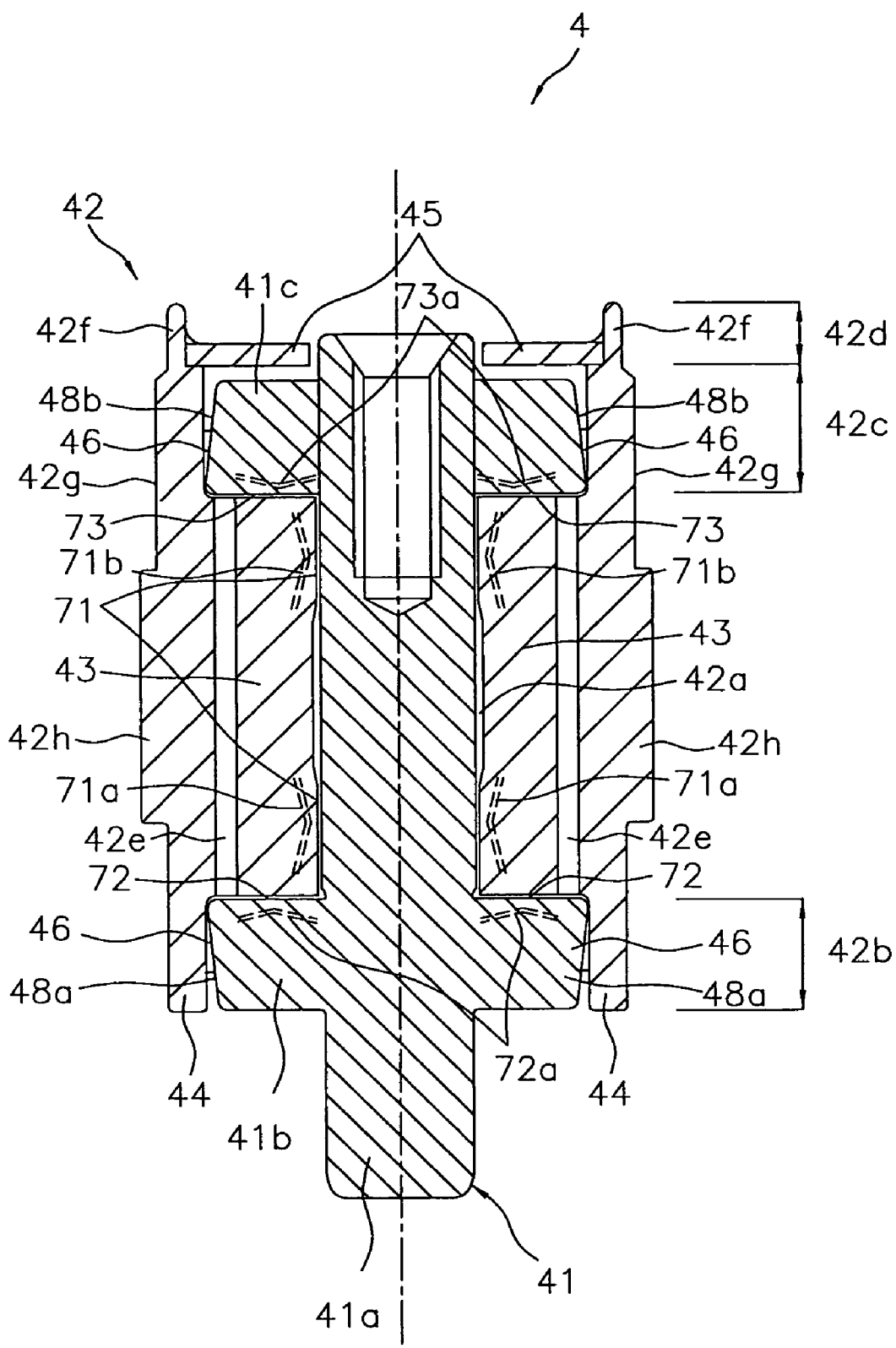
FIG. 2 is an enlarged view showing a structure of a hydrodynamic bearing device included in the spindle motor of FIG. 1.

As shown in FIG. 2, the hydrodynamic bearing device 4 is a device to be supported so as to be rotatable with respect to the base plate 2 and the stator 5. The hydrodynamic bearing device 4 will be described below in more detail.

The stator 5 forms a magnetic circuit with a back yoke 33 and a rotor magnet 34, which will be described later, and is fixed to an outer periphery of the tubular portion 21. A driving force in a rotational direction generated by the magnetic circuit drives the rotor 3 to rotate with respect to the base plate 2 and the stator 5.

[Structure of the rotor 3]

As shown in FIG. 1, the rotor 3 includes the back yoke 33, the rotor magnet 34, and a rotor hub 31.

The back yoke 33 is a circular member provided on a lower side of the rotor hub 31 in an axial direction, and is fixed by press-fitting or the like. Further, the back yoke 33 is formed of a magnetic material.

The rotor magnet 34 is a circular member which is positioned so as to oppose an outer periphery of the stator 5 in a radial direction, and is fixed to an inner periphery of the back yoke 33.

The rotor hub 31 is a member to which recording discs M are attached, and is fixed to an outer periphery of a sleeve 42 (see FIG. 2), which will be described below, by adhering or the like. Further, as shown in FIG. 1, the rotor hub 31 includes a rotor hub main body 35 and a disc placement portion 36.

The rotor hub main body 35 is a tubular portion which supports the recording discs M in the radial direction, and is fixed to the outer periphery of the sleeve 42. On an outer periphery of the rotor hub main body 35, for example, three recording discs M are fitted.

The disc placement portion 36 is a circular portion for placing the recording discs M, and is formed on an outer peripheral side of a lower end of the rotor hub main body 35 in the axial direction.

The recording discs M include, for example, magnetic discs and the like from/to which information can be read/written by information access means (not shown). The recording discs M are fixed to and positioned on the side of the rotor hub main body 35 by a damper 39. For fixing a plurality of the recording discs M, the recording discs M are pinched and fixed by a spacer 40 with a certain distance being interposed between them.

[Structure of the Hydrodynamic Bearing Device 4]

As shown in FIG. 2, the hydrodynamic bearing device 4 is a hydrodynamic bearing device of a both-end open type having both ends of the sleeve 42 being open, and includes the shaft 41 and the sleeve 42. The hydrodynamic bearing device 4 is also a hydrodynamic bearing device of a shaft fixed type in which a rotating member rotates around the fixed shaft 41.

(Shaft 41)

The shaft 41 is a member of a fixed part of the hydrodynamic bearing device 4, and its lower end in the axial direction is fixed to the tubular portion 21 of the base plate 2. Further, the shaft 41 includes a shaft main body 41a, a first thrust flange 41b, and a second thrust flange 41c.

The shaft main body 41a is a cylindrical member which forms a main part of the shaft 41, and is located on the inner peripheral side of the sleeve 42 with a minute gap being provided from the sleeve 42.

The first thrust flange 41b is, for example, a circular member which is integrally formed with the shaft main body 41a, and is located on an inner peripheral side of a first tubular projection 42b so as to oppose a lower end surface of the sleeve 42 in the axial direction with a minute gap interposed therebetween in the axial direction.

The second thrust flange 41c is a circular member located on an opposite side of the first thrust flange 41b in the axial direction with respect to the sleeve 42, and is fixed to the shaft main body 41a by laser welding, press-fitting, adhering or the like, for example. Further, the second thrust flange 41c is located on an inner peripheral side of a second tubular projection 42c so as to oppose an upper end surface of the sleeve 42 in the axial direction with a minute gap interposed therebetween in the axial direction.

The first and second thrust flanges 41b and 41c have thrust dynamic pressure generation grooves 72a and 73a formed on surfaces which oppose parts of the sleeve 42 by etching or the like.

The thrust dynamic pressure generation grooves 72a and 73a are formed between convex portions having a herringbone pattern. The thrust dynamic pressure generation grooves 72a and 73a formed on the first and second thrust flanges 41b and 41c will be described below in more detail.

The first and second thrust flanges 41b and 41c have a tapered shape on outer peripheries. Specifically, the outer peripheral surfaces of the first and second thrust flanges 41b and 41c are inclined such that they become further from the inner surfaces of the first and second tubular protrusions 42b and 42c as they extend toward the lower side and the upper side in the axial direction.

(Sleeve 42)

The sleeve 42 is a tubular member of a rotating part which is symmetrical in a vertical direction and included in the hydrodynamic bearing device 4, and is a tubular member located so as to be rotatable with respect to the shaft 41.

For example, the sleeve 42 includes a tubular portion having a communicating hole 42e, which will be described below, formed by press-fitting (fitting and inserting) and assembling an inner sleeve 43 having a plurality of D cut portions formed on an outer peripheral surface into an outer sleeve 44. More specifically, the sleeve 42 is formed of the inner sleeve 43 and the outer sleeve 44 as described above, and includes a plurality of radial dynamic pressure generating grooves 71a and 71b, a concave portion 42a, the first tubular protrusion 42b, the second tubular protrusion 42c, a fixed portion 42d, a plurality of communicating holes 42e, a damper abutting portion 42f, a rotor hub abutting portion 42g, and a circular convex portion 42h. The inner sleeve 43 and the outer sleeve 44 are formed of a copper alloy, and they are respectively treated with a blank process and then press-fitted to each other to become an integral part. Thereafter, a rough machining, a precision machining, and a radial dynamic pressure groove processing are performed. And after the inner circumference shapes are measured, Ni phosphorous electroless plating is performed until a predetermined thickness (about 1 to 10 µm thickness) is obtained.

The radial dynamic pressure generating grooves 71a and 71b are grooves formed on an inner peripheral surface of the sleeve 42 which are positioned with equal interval from each other in a circumferential direction, and formed between convex portions having a spiral pattern which are not shown in the figure The concave portion 42a is a circular concave portion formed on the inner periphery of the sleeve 42, and positioned between the radial dynamic pressure generating grooves 71a and 71b in the axial direction.

The first and the second protrusions 42b and 42c are tubular portions which are the outer periphery on both ends of the sleeve 42 protruding outward in the axial direction. Facing the inner peripheries of the first and the second protrusions 42b and 42c, the first and the second flanges 41b and 41c are provided. Thus, the inner diameters of the first and the second protrusions 42b and 42c are set to be larger than an inner diameter of the sleeve 42.

The fixed portion 42d is a tubular portion of the sleeve 42 which further protrudes upward in the axial direction from an end of the second tubular portion 42c. The inner diameter of the fixed portion 42d is set to be larger than the inner diameter of the second tubular portion 42c, and a cover 45 is fixed to the inner periphery of the fixed portion 42d by adhering or the like.

The communicating holes 42e are formed between the inner sleeve 43 and the outer sleeve 44, and are positioned with equal intervals from each other in the circumferential direction so as to penetrate the sleeve 42 in the axial direction.

The damper abutting portion 42f is a portion where the damper 39 for fixing the recording discs M to the rotor hub 31 abuts the sleeve 42, and is a tubular portion which further protrudes upward in the axial direction from the end of the second tubular portion 42c. In the present embodiment, the fixed portion 42d and the damper abutting portion 42f refer to the same portion.

The rotor abutting portion 42g is a portion attached such that the rotor hub 31 (see FIG. 1) abuts the sleeve 42.

The circular convex portion 42h is a circular convex portion which is formed approximately near the center of the sleeve 42 in the axial direction.

(Structure of Bearing Portions 71, 72 and 73 Between the Shaft 41 and the Sleeve 42)

A lubricant oil as a working fluid (lubricant) 46 is filled between the shaft 41 and the sleeve 42. Between the first thrust flange 41b and the first tubular portion 42b, and between the second thrust flange 41c and the second tubular portion 42c, tapered seal portions 48a and 48b are respectively formed.

In the hydrodynamic bearing device 4, a radial bearing portion 71 for supporting the rotor 3 in the radial direction is formed of the sleeve 42 having the radial dynamic pressure generating grooves 71a and 71b, the shaft 41, and the lubricating oil 46 interposed therebetween. A first thrust bearing portion 72 for supporting the rotor 3 in the axial direction is formed of the first thrust flange 41b having the thrust dynamic pressure generating groove 72a, the sleeve 42, and the lubricating oil 46 interposed therebetween. A second thrust bearing portion 73 for supporting the rotor 3 in the axial direction is formed of the second thrust flange 41c having the thrust dynamic pressure generating groove 73a, the sleeve 42, and the lubricating oil 46 interposed therebetween.

Now, when a member of the rotating part (for example, the sleeve 42) relatively rotates with respect to a member of the fixed part (for example, the shaft 41), force to maintain (dynamic pressure) a certain gap from the member of the rotating part is generated respectively in the radial direction and the axial direction of the shaft 41 at the bearing portions 71, 72 and 73. In this way, non-contact state between the rotating member and the fixed member can be established, and rotation of the spindle motor 1 can be started efficiently.

[Structure to Suppress Leakage of the Lubricating Oil 46 in the Hydrodynamic Bearing Device 4]

As described above, the lubricating oil 46 which flows into the radial dynamic pressure generating grooves 71a and 71b and the thrust dynamic pressure generating grooves 72a and 73a to generate a dynamic pressure is filled in the gaps formed between the shaft 41, the sleeve 42, and the like which form the hydrodynamic bearing device 4

Figure 3:
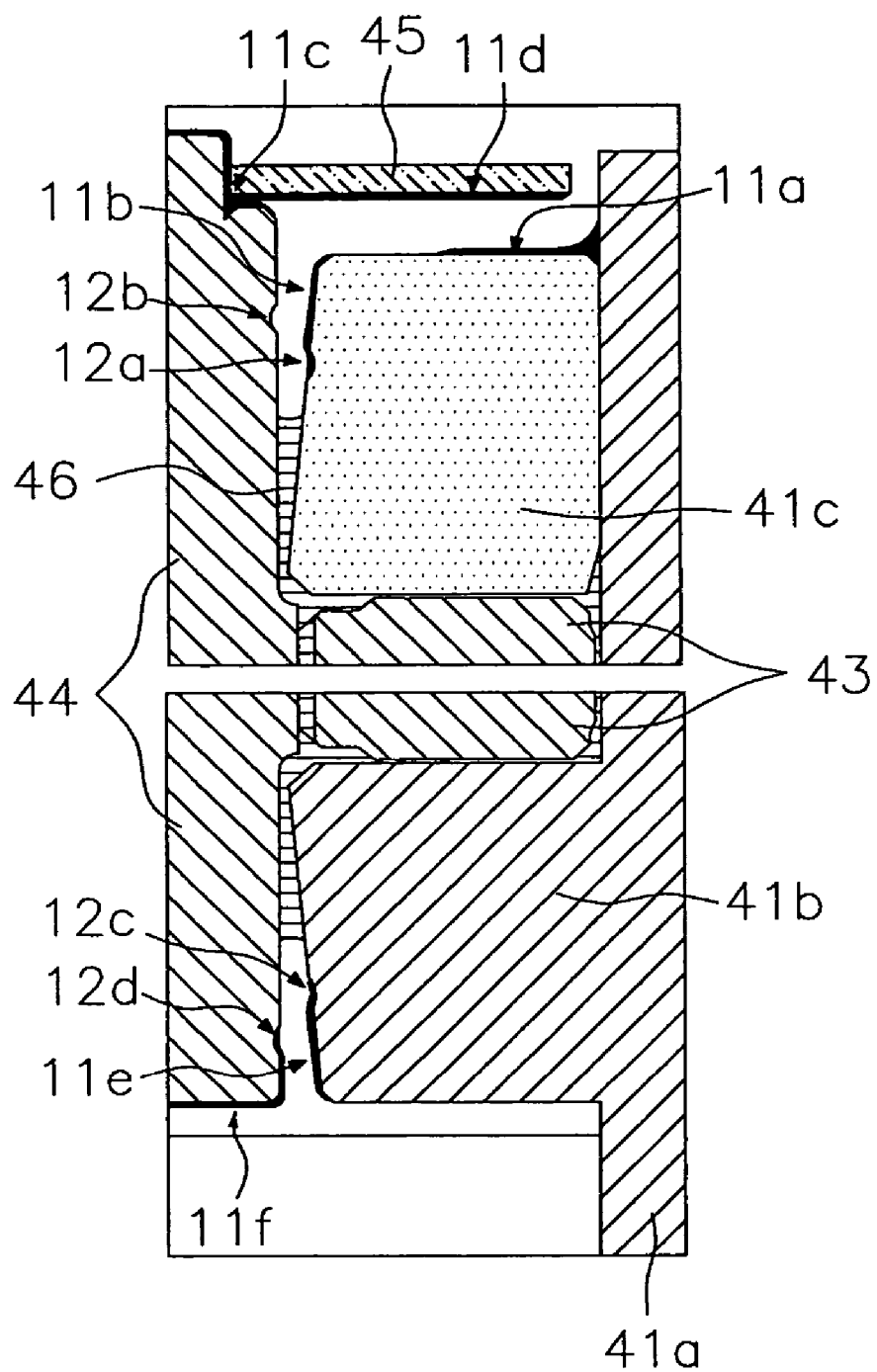
FIG. 3 is an enlarged view showing positions of lube repellants applied to respective portions of the hydrodynamic bearing device of FIG. 2.
Figure 4:
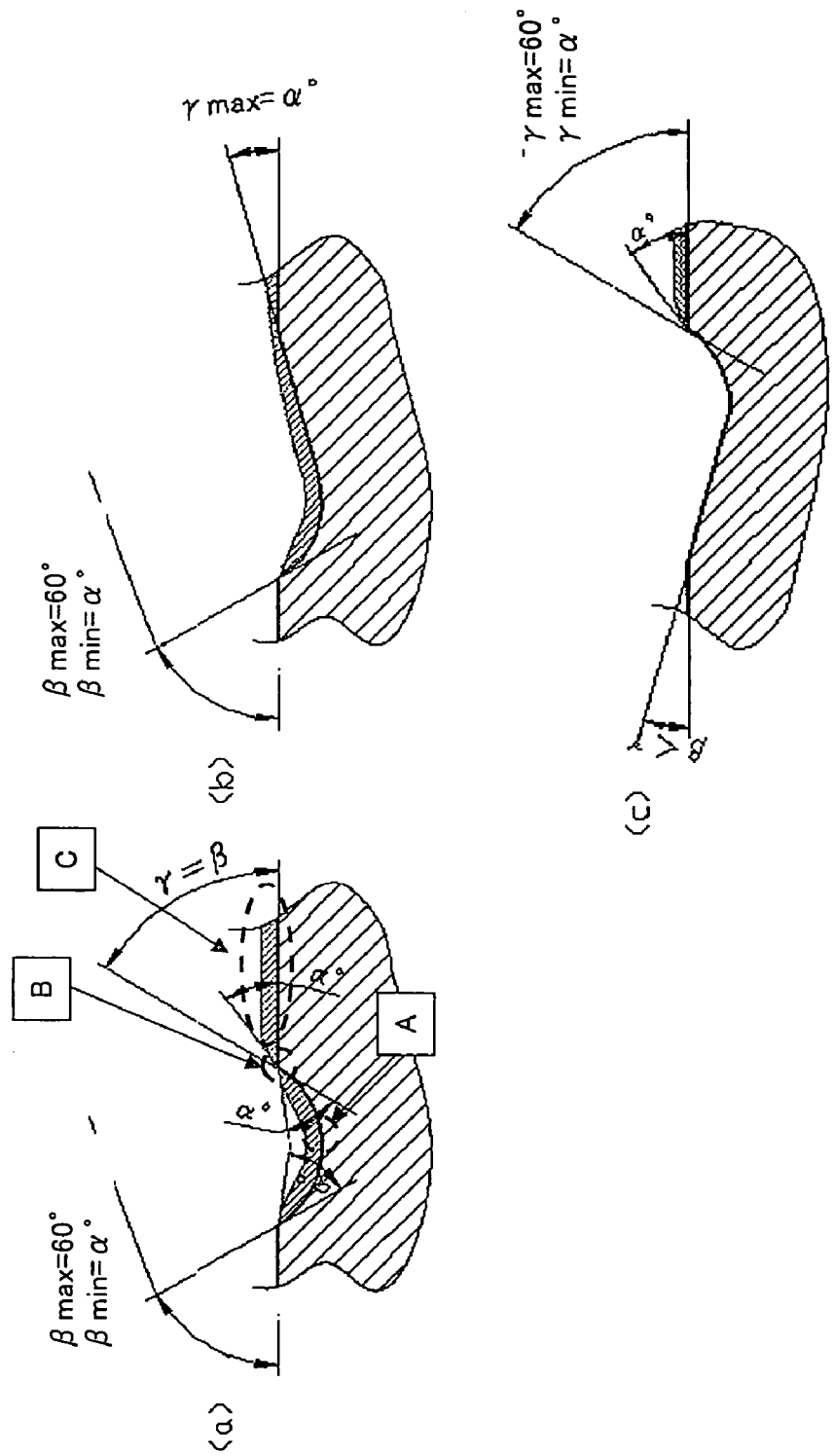
FIGS. 4A through 4C are cross-sectional views schematically showing structures of circular grooves formed on parts of the hydrodynamic bearing device of FIG. 2.

In the present embodiment, in order to improve workability in injecting the lubricating oil 46 into the gaps, and also to prevent the filled lubricating oil 46 from leaking out, as shown in FIG. 3, lube repellants (first through fourth lube repellants) 11a through 11f are applied to a part of respective portions included in the hydrodynamic bearing device 4, and also, circular grooves 12a through 12d are formed.

(Lube Repellants 11a through 11f)

In general, the lube repellant is formed of a substance which makes an angle of contact with a lubricant large when it is applied on a surface, and for example, perfluoro resins are widely used in the HDD.

In the hydrodynamic bearing device 4 according to the present embodiment, it is preferable that the lube repellants 11a through 11f are applied as close as possible to a liquid surface of the lubricating oil 46 filled in the hydrodynamic bearing device 4 in order to reduce a surface area from which the lubricating oil 46 may ooze out.

Generally, the lubricating oil 46 has a thermal coefficient larger than that of materials forming the bearing (copper alloy, aluminum metal, stainless used steel (SUS) metals and the like). Thus, when the temperature rises, the lubricating oil expands within the bearing seal and the liquid surface rises. Thus, for applying the lube repellants 11a through 11f, the positions of application have to be determined in view of temperature rise as well.

A method for applying the lube repellant may be appropriately altered depending upon the shape, material, and size of an object. For example: 1) method for applying by using a dispenser or a brush with the object being chucked and rotated; and 2) a method using a dispenser or a brush with an operator grabbing the object. For applying on a plane surface, 3) a stamping method may also be employed.

The lube repellants respectively applied to the predetermined positions are calcined and cured in an oven. As a result, the thickness of the lube repellant becomes 1 µm or less.

Herein, the lube repellants 11a through 11f are liquid obtained by, for example, diluting a perfluoro resin with perfluoro tributylamine, and for example, a product available under the trade name of "Cytop" or the like may be used.

An angle of contact α to a metal material surface at room temperature before the lube repellants 11a through 11f are cured may slightly vary depending upon the type of metal, but is about 16 degrees on a clean mirror plane of about Rz 0.5, and is 7 to 9 degrees on a clean metal surface having a surface roughness of about Rz 3.2. When the lube repellants 11a through 11f are cured and attached, an angle of contact between the lube repellant 11a through 11f and water becomes 100° or larger.

The lube repellant 11a through 11f are applied first, and then heated in an oven at a temperature of 100 to 120° C. for 2 hours to be calcined and cured to form an application surface having the oil repelling effect.

The positions on which the lube repellants 11a through 11f are applied to respective portions are as described below.

As shown in FIG. 3, the lube repellant (the first lube repellant) 11a is applied on an upper surface (first surface) of the second thrust flange 41c in a circular shape of a predetermined width from a portion where the shaft 41 and the second thrust flange 41c are connected to each other in a radial direction having the rotational axis of the shaft 41 as the center. Between the lube repellant 11a and the lube repellant 11b applied on an upper end of an outer peripheral surface of the second thrust flange 41c in the radial direction, which is continuous from the upper surface, a non-application surface with no lube repellant applied thereon is formed. In the present embodiment, the lube repellant 11a is applied after the upper thrust flange is fixed to the fixed shaft. However, the present invention is not limited to this, and the lube repellant 11a may be applied to only an inner periphery of the upper surface of the upper thrust flange in a separate state.

As shown in FIG. 3, the lube repellant (second lube repellant) 11b is applied in a circular portion on an outer peripheral surface of the second thrust flange 41c, which forms a gap of a tapered shape (first gap portion) with an inner peripheral surface of the outer sleeve 44 in an upper portion of the hydrodynamic bearing device 4, from an upper end to a portion where a circular groove 12a is formed. In other words, the lube repellant 11b is applied around a portion opposing a circular groove 12b formed on the inner peripheral surface of the outer sleeve 44 within the gap formed between the outer peripheral surface of the second thrust flange 41c in the radial direction and the inner peripheral surface of the outer sleeve 44 (the first gap portion). The circular grooves 12a and 12b will be described later in detail.

As shown in FIG. 3, the lube repellant (fourth lube repellant) 11c is applied to an inner peripheral surface of the fixed portion 42d which is a part of the outer sleeve 44 to which the cover 45 is fitted in. In other words, the lube repellant 11c is applied to a step portion formed on the inner peripheral surface of the damper abutting portion 42f, which is above the circular groove 12b formed on the inner peripheral surface of the outer sleeve 44.

As shown in FIG. 3, the lube repellant (fourth lube repellant,) 11d is applied across an entire back surface (surface on the bearing side) of the cover 45 having a circular shape.

As shown in FIG. 3, the lube repellant (third lube repellant) 11e is applied in a circular portion on an outer peripheral surface of the first thrust flange 41b, which forms a gap of a tapered shape (second gap portion) with the inner peripheral surface of the outer sleeve 44 in a lower portion of the hydrodynamic bearing device 4, from a lower end to a portion where a circular groove 12c is formed. In other words, the lube repellant 11e is applied around a portion opposing a circular groove 12d formed on the inner peripheral surface of the outer sleeve 44 within the gap formed between the outer peripheral surface of the first thrust flange 41b in the radial direction and the inner peripheral surface of the outer sleeve 44 (the second gap portion). The circular grooves 12c and 12d will be described later in detail.

As shown in FIG. 3, the lube repellant (second lube repellant) 11f is applied across a lower surface of the outer sleeve 44 to a circular groove 12d formed on the inner peripheral surface. Particularly, the lube repellant 11f applied on the inner peripheral surface of the outer sleeve 44 is applied to a position opposing the lube repellant 11e applied on the first thrust flange 41b within the gap which is formed with the outer peripheral surface of the first thrust flange 41b (second gap portion).

The lube repellants 11b, 11c, 11e and 11f are applied in outward direction from three circular grooves 12a, 12c, and 12d toward outside the bearing before the components are assembled and they are separate from each other.

(Circular Grooves 12a Through 12)

In the hydrodynamic bearing device 4 according to the present embodiment, at least one of the circular grooves 12a, 12b, 12c, and 12d having cross sections of a substantially arc shape are formed on at least one of two surfaces opposing each other in the tapered seal portions.

Herein, as shown in FIG. 3, the shape of the cross sections of the grooves of the circular grooves 12a through 12d are arc groove shapes which are symmetrical in vertical direction.

The circular grooves 12a through 12d will be described as follows.

As shown in FIG. 3, the circular groove 12a is formed slightly above the central portion of the outer peripheral surface of the second thrust flange 41c in the radial direction. In other words, the circular groove 12a is formed on the outer peripheral surface of the second thrust flange 41c within the gap formed between the second thrust flange 41c and the outer sleeve 44 (the first gap portion). In the circular groove 12a, the lube repellant 11b is applied as described above. The position of the circular groove 12a with respect to the height direction is set in accordance with the level of the liquid surface of the lubricating oil 46.

As shown in FIG. 3, the circular groove 12b is formed on the inner peripheral surface of the outer sleeve 44 slightly above the portion opposing the circular groove 12a formed on the second thrust flange 41c. In other words, the circular groove 12b is formed on the inner peripheral surface of the outer sleeve 44 within the gap formed between the second thrust flange 41c and the outer sleeve 44 (the first gap portion) similarly to the circular groove 12a. Similarly to the circular groove 12a, the position of the circular groove 12b with respect to the height direction is also set in accordance with the level of the liquid surface of the lubricating oil 46.

As shown in FIG. 3, the circular groove 12c is formed slightly below the central portion of the outer peripheral surface of the first thrust flange 41b in the radial direction. In other words, the circular groove 12c is formed on the outer peripheral surface of the first thrust flange 41b within the gap formed between the first thrust flange 41b and the outer sleeve 44 (the second gap portion). In the circular groove 12c, the lube repellant 11e is applied as described above. The position of the circular groove 12c with respect to the height direction is set in accordance with the level of the liquid surface of the lubricating oil 46 in the lower portion of the hydrodynamic bearing device 4.

As shown in FIG. 3, the circular groove 12d is formed on the inner peripheral surface of the outer sleeve 44 slightly below the portion opposing the circular groove 12c formed on the first thrust flange 41b. In other words, the circular groove 12d is formed on the inner peripheral surface of the outer sleeve 44 within the gap formed between the first thrust flange 41b and the outer sleeve 44 (the second gap portion) similarly to the circular groove 12c. In the circular groove 12d, the lube repellant 11f is applied as described above. Similarly to the circular groove 12c, the position of the circular groove 12d with respect to the height direction is also set in accordance with the level of the liquid surface of the lubricating oil 46.

The circular groove 12c and the circular groove 12d, and the circular groove 12a and the circular groove 12b are formed with their positions in the radial direction being shifted from each other.

This structure is employed in order to avoid a large cavity which is formed if the circular groove 12c and the circular groove 12d, and/or the circular groove 12a and the circular groove 12b are formed in positions opposing each other. This is a structure for preventing a large bubble from remaining even when one is formed in the circular groove 12c and the circular groove 12d, or in the circular groove 12a and the circular groove 12b in the case where the hydrodynamic bearing device 4 is subjected to rapid decompression with the circular grooves 12a through 12d being filled with the lubricating oil 46.

In this way, it becomes possible to prevent leakage of the lubricating oil 46 due to rapid explosion of the liquid surface of the lubricating oil 46 caused by the presence of a bubble in the lubricating oil 46.

Hereinafter, applying the lube repellants 11a through 11f around the circular grooves 12a through 12d as described above using a nozzle will be described with reference to FIGS. 4A through 4D. For convenience of the explanation, drawings in which surfaces with the circular grooves formed thereon are positioned along a substantially horizontal direction are used. However, the right-hand side of the drawings is assumed as the upside in reality. Letters A through C in the figure indicates position of applying the lube repellants when a nozzle is used.

First, as shown in FIG. 4A, when a nozzle is put on only position C to apply the lube repellant, the lube repellant may not spread entirely in the circular groove depending upon the relationship between the formed angle of the circular groove and the angle of contact between the lube repellant and the application surface. Therefore, if it is not desired to apply the lube repellant inside the circular groove, the circular groove may be formed such that the corner on the right hand side of the circular groove (on the side distant from the liquid surface of the lubricating oil 46) becomes larger than the angle of contact α of the lube repellant as shown in FIG. 4A.

On the other hand, in the case where the nozzle tip is aimed at position A in order to apply the lube repellant inside the circular groove, the lube repellant can be applied only in the circular groove if the diameter of the liquid drop of the lube repellant discharged from the nozzle is smaller than the width of the circular shape.

However, increasing the width of the circular groove makes the area of the bearing seal for preventing the lubricating oil 46 smaller. Thus, this results in difficulty in designing in general. Therefore, in order to apply the lube repellant in the circular groove, it is desirable that the lube repellant is discharged from the nozzle aiming at the corner B shown in FIG. 4A. Alternatively, as shown in FIG. 4B, angle β of the left hand side corner, which is on the side close to the liquid surface of the lubricating oil 46, may be made larger than the angle of contact α of the lube repellant to have a sharp corner, and angle γ of the right-hand side corner, which is on the side distant from the liquid surface of the lubricating oil 46, may be made smaller than the angle of contact α of the lube repellant, ½, or may have a gentle R surface. By employing such a structure, it is ensured that the lube repellant is spread to the left-hand side corner in the circular groove even when the relative positions of the nozzle and the application object are shifted.

On the other hand, in the case of allowing the lubricating oil to reach inside the circular groove in order to secure the storage amount of the lubricating oil 46, it is preferable to make the angle β of the corner near the liquid surface of the lubricating oil 46 small, or have gentle R surface, and to make the angle γ of the corner distant from the liquid surface larger than the angle of contact α of the lube repellant to become a sharp corner. As shown in FIG. 4C.

Next, applying the lube repellant to the circular groove having the shape shown in FIG. 4A using a dispenser will be described. The lube repellant as shown in FIG. 4A is the lube repellant immediately after the application and before baking and curing. Before baking and curing, the lube repellant has a film thickness ranging few microns to few hundreds of microns. However, after baking and curing, its volatile components volatilize and the film thickness is in order of microns.

First, the application object of the lube repellant is rotated around its central axis.

Next, a tip nozzle of the dispenser is brought closer to the application surface, and a predetermined amount is discharged from the nozzle continuously or in a pulse.

The nozzle is brought closer to point B shown in FIG. 4A with the lube repellant being discharged while the object is rotated for one round, and then, point C is aimed while the object is rotated for another round. In this way, the lube repellant discharged from the nozzle is attached to the right-hand side of the circular groove, and the upper portion of the tapered surface, and then, spread. The lube repellant attached to the right-hand side portion inside the circular groove is spread to the left corner edge of the circular groove.

Herein, the left corner of the circular groove forms angle β with the tapered surface. The angle β is 60 degrees at most in order to prevent a burr being generated, and is larger than the angle of contact α, which is formed by the lube repellant with the application object when the Tube repellant is in a liquid form before curing and the application object is polished to have a mirror plane.

As a result of experiment, it is found that, as long as the angle β is larger than the angle of contact α of the lube repellant, the lube repellant cannot climb over the corner portion to spread across irrespective of surface roughness.

Also, the right corner of the circular groove forms angle γ with the tapered surface. However, the circular groove shown in FIG. 4A has a shape symmetrical in the horizontal direction, and $\gamma = \beta \geq \alpha$. That means the lube repellant does not climb over both of the corners of the circular groove to spread across. Therefore, if an appropriate amount of the lube repellant is applied aiming at the point B, the lube repellant is applied inside the circular groove and the upper portion of the tapered surface.

As described above, the lube repellant contacts with the metal surface with a certain angle of contact while it is in a liquid from before being cured.

FIG. 8A to 8E shows results of evaluation experimentation. In the experimentation, a sample having a cylindrical surface of a diameter of 5 mm and a tapered surface having a certain angle provided thereon is prepared for different surface roughness. One drop (about 0.2 μm) of the lube repellant is applied on the cylindrical surface of the sample in a horizontal position near the border between the cylindrical surface and the tapered surface, and then, the position of the sample is immediately changed to vertical position with the cylindrical surface being on the upper side. The sample is left in that position for 5 minutes or more, and whether the lube repellant drips down to the tapered surface or not is examined. Four types of metal materials are used in the experimentation as the material for the application surfaces on which the lube repellant is applied: SUS; Al (aluminum); brass; and brass treated with electroless NiP plating.

A viscosity of the lube repellant at 25° C. is 80 mPa·S or lower. Further, the samples are treated with a lathe work with a work pitch and nose R of the bite being appropriately set. The sample of Rz 0.5 is also treated with lapping by turning the sample. The horizontal axis in the graphs indicates the number of times the lube repellant is dripped down to the tapered surfaces out of five times of the experiment repeated for each of the conditions. Further, the bald dotted chain lines in the graphs indicate angles of contact on the mirror plane, which are between 15° and 17° irrespective of the materials.

As shown by FIGS. 8A through 8E, wettability of the lube repellant varies depending upon the surface roughness of the application surface.

As an indicator for surface roughness in this example, Rz representing the surface roughness in maximum height of a profile curve, which is defined by the JIS standards (JIS B 0601:2001), is used.

Figure 8C:
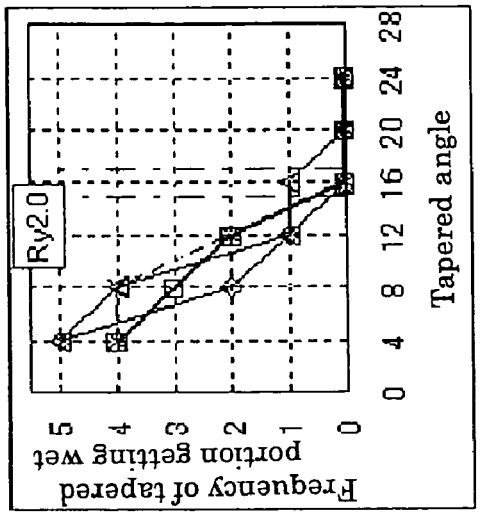
FIGS. 8A through 8E are graphs showing results of experimentation for examining relationship between a tapered angle and wettability of the lube repellant for each surface roughness of an application surface.
Figure 8B:
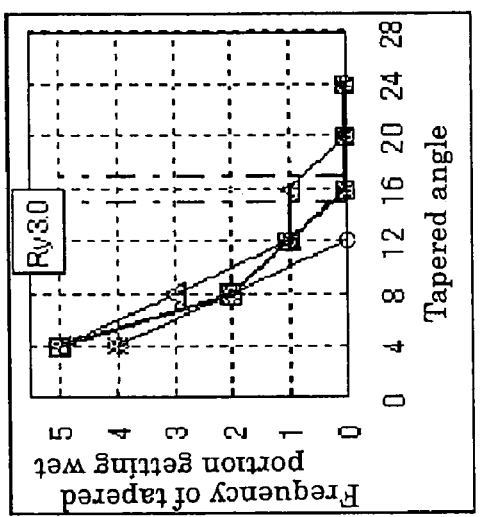
Figure 8E:
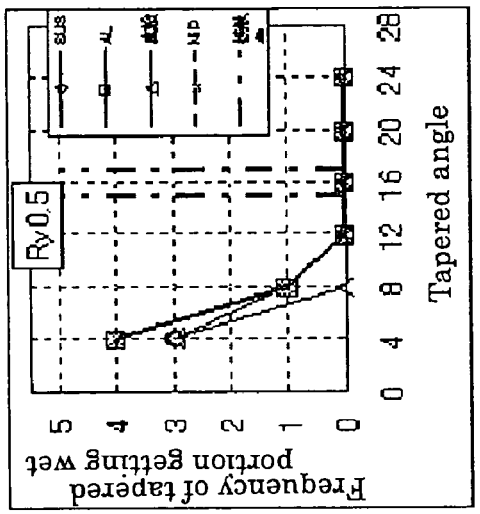
Figure 8A:
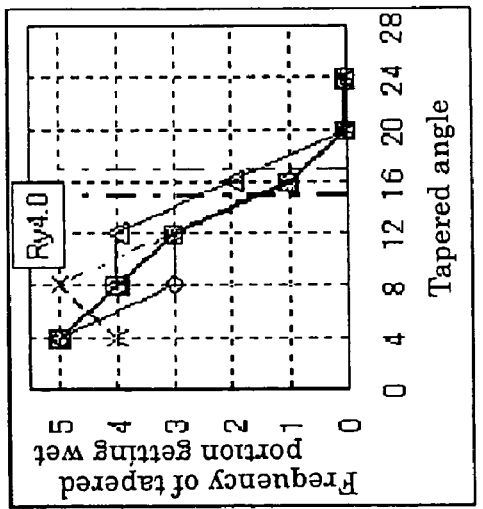
Figure 8D:
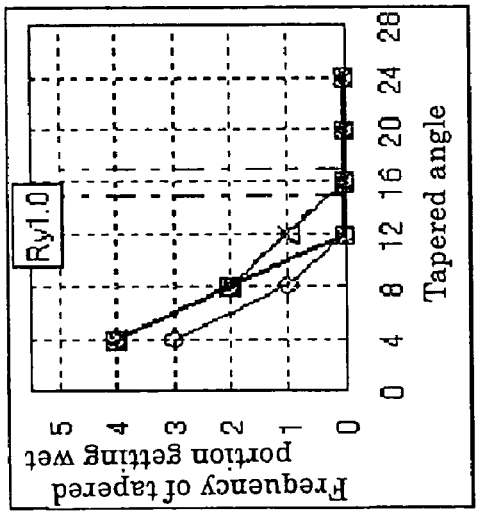

For example, as shown by FIG. 8A, in the result of the experiment with the largest surface roughness, Rz 4.0, the wettable frequency becomes zero when the tapered angle is 20 degrees or higher. As shown by FIGS. 8B through 8E, the tapered angle with which the wettable frequency becomes zero decreases as the surface roughness Rz is reduced.

In this experimentation, the samples are positioned vertically immediately after application. Thus, there were few cases that the lube repellant is dripped down to the tapered surface even when the tapered angle is larger than the angle of contact. However, when the samples were maintained in the horizontal position for 5 seconds or more after application, a drop of the lube repellant spreads in a circumferential direction, and the dripping due to the weight of the drop of the lube repellant itself is suppressed, and it does not drip down to the tapered surface.

In the actual process, it is usual to change the position after the sample is left for few seconds to agree with the surface. Therefore, there is no need to worry about the lube repellant spreading over the tapered portion beyond the border with the cylindrical portion as long as the tapered angle is larger than the angle of contact α.

Based on the results of the experimentation, it is found that, as the surface roughness of the application surface increases, an apparent angle of contact of the lube repellant becomes smaller and more easily wets the metal surface, and spreading of the lube repellant cannot suppressed unless it has a large crossing angle. However, it is also found that, as the surface roughness increases, spreading can be suppressed if the tapered angle is larger than the angle.

On the other hand, if the surface is clean and has a small surface roughness indicator such as a mirror plane, the applied lube repellant does not cross over the border with the cylindrical portion even when the tapered angle is smaller than the angle of contact.

Based on the above results, a large surface roughness is desirable for a region which has to be applied with the lube repellant. In this way, the wettability of the lube repellant on the application surface can be improved by increasing the surface roughness to spread the lube repellant evenly on an area intended to be applied. This means that the surface roughness may be varied such that it is increased for a surface which is desired to apply the lube repellant, and it is reduced for a surface which is not desired to be applied.

Thus, for example, when it is desired to apply the lube repellant inside the circular groove, the surface roughness of the circular groove may be increased, while the surface roughness of sealing wall surface other than the circular groove is reduced. Contrary, if it is not desired to apply the lube repellant, the roughness of the circular groove may be made small, and the surface roughness of the non-seal surface may be made large.

The sealing wall surface of the hydrodynamic bearing device 4 refers to a surface which the liquid surface of the lubricating oil 46 reaches when the bearing is functioning normally. The non-sealing wall surface of the hydrodynamic bearing device 4 refers to the surfaces other than the sealing wall surface and the except for the circular grooves 12a through 12d.

The cross angle of the boundary between the sealing wall surface or the non-sealing wall surface and the circular grooves 12a through 12d is not less than the angle of contact α of the lube repellants 11a through 11f with the application surface when the lube repellants 11a through 11f are in liquid form. The boundary between them may be connected with a fillet shape having chamfering C=0.1 or smaller; or a circular are R=0.1 or smaller.

Hereinafter, examples are illustrated.

Figures 10A, 10B, 10C, 10D, 10E, 10F, 10G:
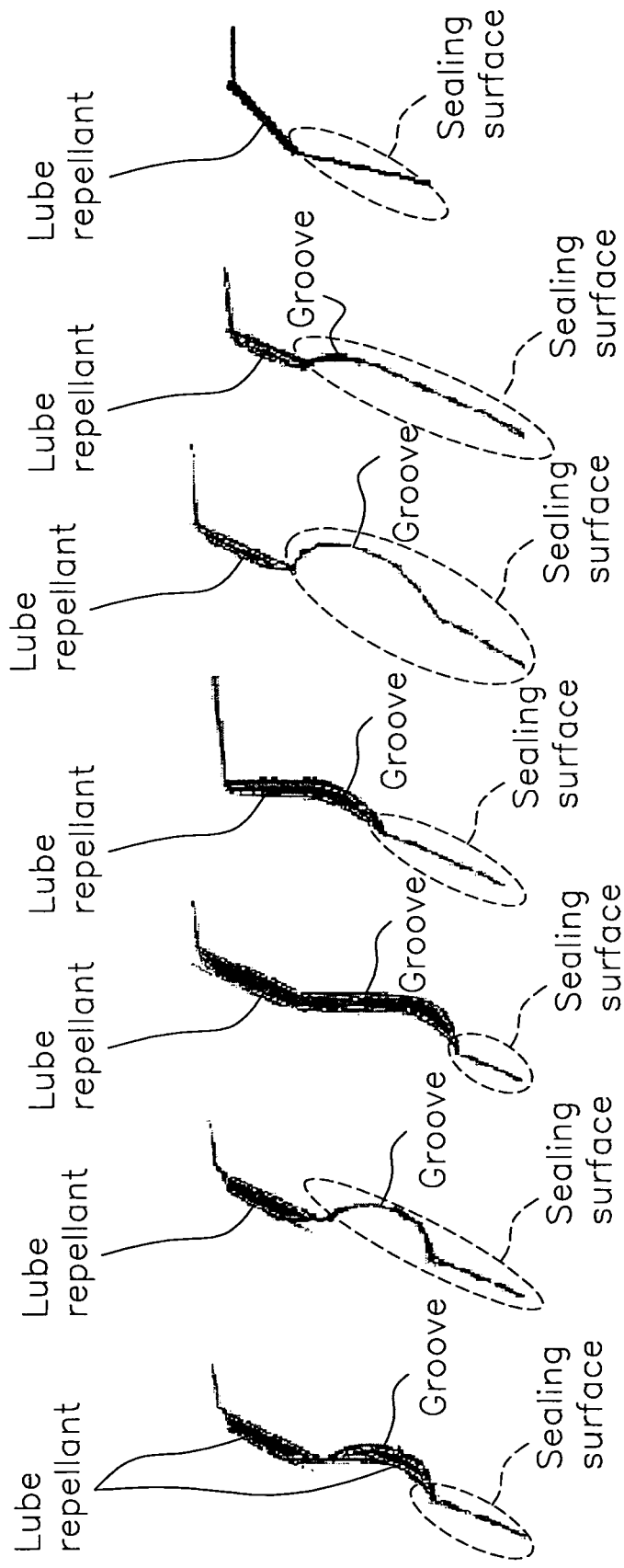
FIGS. 10A through 10G are schematic diagrams showing positional relationship between a seal surface and a non-seal surface.

Among the shapes shown in FIGS. 10A through 10F, the shapes shown in FIGS. 10A and 10B are considered most preferable.

In FIG. 10A, the circular groove is symmetrical in the vertical direction, and the angle it forms with the sealing wall surface is larger than angle α and does not exceed 60 degrees. The lube repellant is applied to the inside of the circular groove.

In FIG. 10B, the circular groove is symmetrical in the vertical direction, and the angle it forms with the sealing wall surface is larger than the angle α and does not exceed 60 degrees. The lube repellant is applied to an upper boundary of the circular groove.

In FIG. 10C, the circular groove is asymmetrical in the vertical direction, and an upper boundary has a gentle fillet of R 0.1 or higher, or a crossing angle smaller than the angle α. The lube repellant is applied to the inside of the circular groove.

In FIG. 10D, the circular groove is asymmetrical in the vertical direction, and the angle the lower boundary forms with the sealing wall surface is larger than angle α and does not exceed 60 degrees. The circular groove is extended outside a bearing sealing gap portion. The lube repellant is applied to the inside of the circular groove.

In FIG. 10E, the circular groove is asymmetrical in the vertical direction, and the angle the upper boundary forms with the non-sealing wall surface is larger than angle α and does not exceed 60 degrees. The lube repellant is applied from the upper boundary to the non-sealing wall surface.

In FIG. 10F, the circular groove is asymmetrical in vertical direction, and the lower boundary smoothly leads to the sealing wall surface. The angle the upper boundary forms with the non-sealing wall surface is larger than angle α and does not exceed 60 degrees.

In FIG. 10G, the seal surface and the non-seal surface are almost linear near the crossing point. The crossing angle is larger than angle α and is smaller than 60 degrees.

In the shape shown in FIG. 10B, the lube repellant is not applied inside the groove. Thus, a buffer area for the liquid surface of the lubricant to move may be larger by the height of the circular groove. As a result, there are more margins for leakage of the lubricating oil when the volume of the lubricant expands under a high-temperature circumstance.

The radii of the circular arcs of the shapes shown in FIGS. 10A through 10F are desirable to be 50 μm or longer.

This is because, even if the lube repellant is applied inside the circular groove, once the lubricant enters the groove having a small inner radial, the effect of the lube repellant becomes weak and the lubricant remains at the groove, making it difficult to be removed. However, if a shock is applied to the HDD after it is shipped as a product, the lubricant remaining in the portion may easily come out because the wettability of the surface of the portion is originally low.

The lube repellant does not have to be applied to the upper edge of the non-sealing wall surface. Also, it does not have to be applied to a crossing portion of the seal surface and the non-seal surface.

<Process of Injecting Lubricating Oil 46>

In the hydrodynamic bearing device 4 according to the present embodiment, the circular grooves are formed on respective portions and the lube repellant is applied around them as described above. Then, the lubricating oil 46 is injected to the thrust bearing portions 72 and 73 and radial bearing portion 71 of the hydrodynamic bearing device 4 as described below.

The lubricating oil 46 is filled in the gaps formed in the upper and lower portions of the hydrodynamic bearing device 4 (the first gap portion and the second gap portion) without any space to the side closer to the radial bearing portion 71 on which the radial dynamic pressure generating grooves 71a and 71b are formed than the circular grooves 12a through 12d. The liquid surface of the lubricating oil 46 is adjusted upon injection such that, even when the lubricating oil 46 is expanded when the maximum temperature rises, it does not reach to the portions where the lube repellant 11a through 11f are applied within the gap portion formed in the second thrust flange 41c and the outer sleeve 44. Hereinafter, the method for injecting the lubricating oil 46 and the method for adjusting the liquid surface are described with reference to FIGS. 5A through 7A.

First, the lubricating oil 46 is injected under vacuum condition to avoid a bubble entering the bearing. Then, the shaft 41 is inserted into the sleeve 42, and the second thrust flange 41c is fixed with respect to the shaft 41. The second thrust flange 41c may be fixed by adhering, press fitting, laser welding, or the like. For fixing the second thrust flange 41c, a jig which is not shown is used for setting and adjustment such that the thrust bearing portions 72 and 73 have a predetermined amount of play in the axial direction.

Next, general procedures of the process for injecting the lubricating oil 46 and the following process for assembling the hydrodynamic bearing device 4 will be described with reference to a flow diagram shown in FIG. 9.

In step S1, the hydrodynamic bearing device 4 assembled as described above is placed in a vacuum chamber of about $10^{-2}$ Pa in a vertical position, and air is removed from the bearing portion of the hydrodynamic bearing device 4.

In step S2, a predetermined amount of the lubricating oil 46 is dripped between the lube repellant 11a and the lube repellant 11c from an open end of the hydrodynamic bearing device 4 set in the vacuum chamber. As shown in FIG. 5A, the lubricating oil 46 becomes a large drop, and is guided toward inside the bearing by its weight and the capillary force of the gap corresponding to the tapered seal portion formed between the second thrust flange 41c and the outer sleeve 44 although the lube repellant 11b is applied on the bearing seal surface.

On an upper surface of the second thrust flange 41c, a non-application portion to which the lube repellant is not applied is formed between the lube repellant 11a and the lube repellant 11b. The predetermined amount of dripped lubricating oil 46 attaches to the non-application portion, and it forms a large drop having a large apparent angle of contact due to the lube repellant. Surfaces of the lube repellants 11a and 11c do not become wet. As a result, there is no need to worry about making the screw holes for fixing the cover 45 and the like on the side and the top of the shaft 41 wet, and an operation of wiping off during assembly becomes easy.

When an amount of the lubricating oil 46 is insufficient in one drop, dripping may be repeated for several times.

In step S3, as shown in FIG. 5B, the lubricating oil 46 is filled to the portions around the thrust bearing portions 72 and 73 via a communicating hole on the outer periphery of the thrust bearing portions which is not shown. In the bearing seal of the thrust bearing portion, the lube repellants 11e and 11f are applied respectively on the outer peripheral surface of the first thrust flange 41b and the inner peripheral surface of the outer sleeve 44, which correspond to the fixed part and the rotating part. Thus, downward movement of the lubricating oil 46 is restricted by the lube repellants 11e and 11f, and the lubricating oil 46 is prevented from moving below the portions where the lube repellants 11e and 11f are applied.

Regarding the bearing seal portion of the first thrust flange 41b, even when the lube repellant is applied to either one of the first thrust flange 41b or the outer sleeve 44, the lubricating oil 46 can be sealed. However, in the present embodiment, the lube repellant is applied to both of the members corresponding to the rotating part and the fixed part in order to suppress evaporation of the lubricating oil 46 due to leakage of the lubricating oil 46.

In step S3, as shown in FIG. 5B, the lubricating oil 46 has not yet reached the side of the radial bearing portion 71, and stops near the innermost periphery of the thrust bearing portions 72 and 73.

The lubricating oil 46 stops near the innermost periphery of the thrust bearing portions 72 and 73 as shown in FIG. 5B because a gap where the thrust bearing portions 72 and 73 and the radial bearing portion 71 cross each other is large and the movement of the lubricating oil 46 due to the capillary force stops. However, there is play of several tens μm in the axial direction on the thrust bearing portions 72 and 73 side. Thus, the lubricating oil 46 may be filled from the thrust bearing portions 72 and 73 side to the lower edge of the radial bearing portion 71.

Figure 7A:
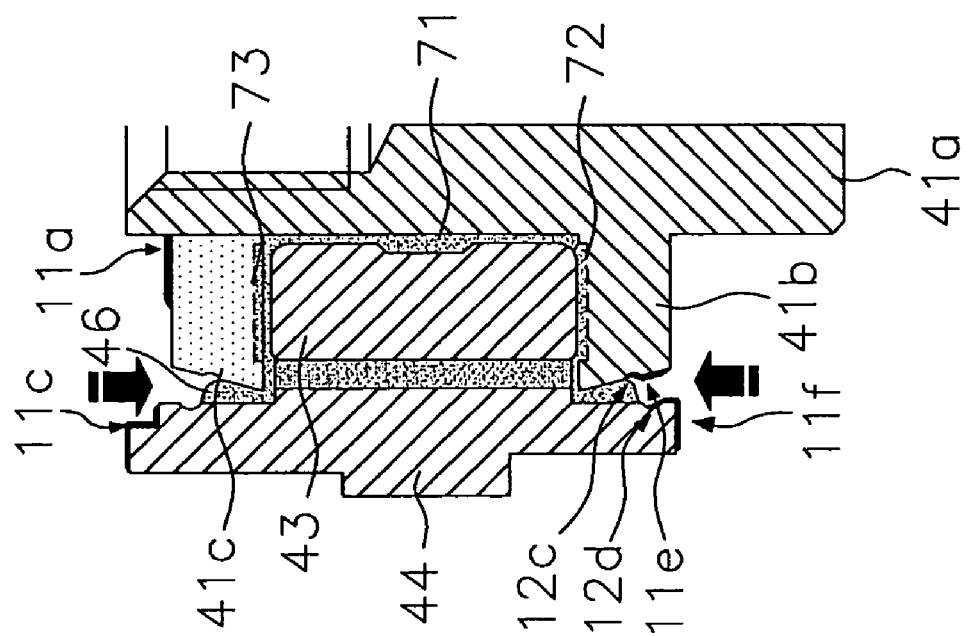
FIGS. 7A and 7B are enlarged views showing a flow of a final process for injecting a lubricant to the hydrodynamic bearing device of FIG. 2.

In step S4, the hydrodynamic bearing device 4 having the lubricating oil 46 moved to the position shown in FIG. 7A is subjected to an external circumstance change until the pressure becomes the atmospheric pressure, or a pressure higher than the pressure obtained by decompression.

Figure 7B:
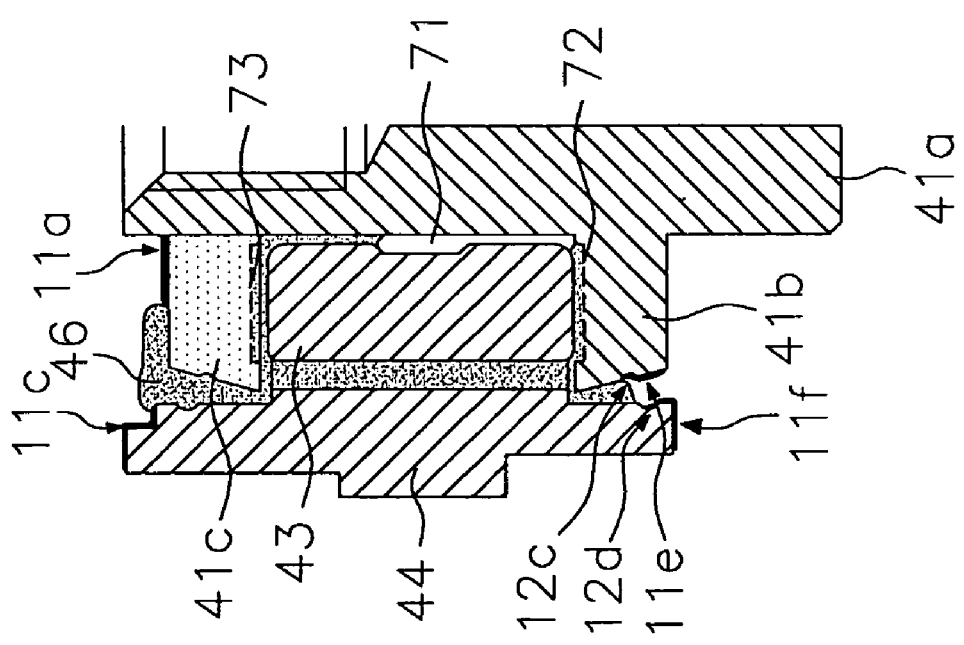

Then, the radial bearing portion 71 which has not yet been filled with the lubricating oil 46 in step S3 is filled with the lubricating oil 46 pressed by the atmospheric pressure as shown in FIGS. 5C and 7B.

In step S5, extra remaining oil drop 46a (see FIG. 5C) is sucked and removed at the both ends of the hydrodynamic bearing device 4, and the lubricating oil 46 is adjusted to have the liquid surface of a predetermined level in the bearing gap of the hydrodynamic bearing device 4.

The remaining oil drop 46b attached to the cylindrical surface below the lube repellant 11b (see FIG. 5C) is sucked and removed when the liquid surface level of the lubricating oil 46 is adjusted.

In step S6, as shown in FIG. 6A, the remaining oil drops 46a attached to a portion where the lube repellant is not applied between the lube repellant 11a and the lube repellant 11b on the top surface of the second thrust flange 41c is cleaned and removed.

In the present embodiment, the portion where the lube repellant is not applied is on the top surface of the second thrust flange 41c and a plane surface on the open end of the bearing. Thus, the extra lube repellant can be easily wiped off. Further, even when oil drops are remaining on the lube repellant 11a and 11c, since the lube repellant 11a and 11c repel the lubricating oil 46 and form it into drops, the oil drops can be easily wiped off.

The lube repellant is applied to the bearing seal surface. Therefore, the lubricating oil 46 does not continue from the liquid surface of the lubricating oil 46 to the top surface of the bearing, but forms drops separate from each other. Thus, the lubricating oil 46 is sucked not more than it is intended during wiping off.

Thereafter, in step S7, as shown in FIG. 6B, the cover 45 having the lube repellant 11d applied on its back surface is adhered and fixed to the inner periphery of the fixed portion 42 in the upper portion of the outer sleeve 44.

[Features of the Present Hydrodynamic Bearing Device 4]

(1)

As shown in FIG. 3, the hydrodynamic bearing device 4 according to the present embodiment includes the lube repellant 11a applied on the top surface in a circular shape in the radial direction by a predetermined distance from a portion where the second thrust flange 41c is connected to the shaft 41 in the radial direction, and the lube repellant 11b applied in a circular shape by a predetermined distance below the upper edge of the outer peripheral surface of the second thrust flange 41c. The lube repellant 11b is applied near the upper end within the gap formed between the outer peripheral surface of the second thrust flange 41c and the inner peripheral surface of the outer sleeve 44.

Thus, when the lubricating oil 46 is injected to the bearing of the hydrodynamic bearing device 4 even a large amount of the lubricating oil 46 is dripped as shown in FIG. 5A, the leakage of the lubricating oil 46 toward the shaft 41 can be suppressed by the lube repellant 11a. Therefore, an amount of one drop of the lubricating oil 46 can be increased compared to that in the conventional art and filling of the lubricating oil 46 can be performed efficiently.

The lube repellant 11b applied within the gap does not hamper filling of the lubricating oil 46 during a process of guiding the lubricating oil 46 into the gap (bearing) because it is guided smoothly by the gravity applied to the lubricating oil 46 and capillary force which is in effect within the gap.

The lube repellant 11b functions so as to leave the remaining oil drops 46a of the lubricating oil 46 only in an area between the lube repellants 11b and 11a. In this way, it becomes possible to prevent the lubricating oil 46 from spreading over the second thrust flange 41c and increasing the rate of evaporation, and to efficiently suck and remove the remaining oil drops 46a or the like after the lubricating oil 46 is filled.

After the lubricating oil 46 is filled, for example, even when the lubricating oil 46 almost leaks out of the bearing due to vibration or the like applied to the hydrodynamic bearing device 4 from the outside when it is used, the lube repellant 11b applied near the upper end of the tapered seal portion can prevent the lubricating oil 46 from moving above the lube repellant 11b. As a result, in the hydrodynamic bearing device 4 after the lubricating oil 46 is filled, leakage of the lubricating oil 46 can be efficiently prevented.

(2)

As shown in FIG. 3, in the hydrodynamic bearing device 4 according to the present embodiment, the gap formed between the outer peripheral surface of the second thrust flange 41c and the inner peripheral surface of the outer sleeve 44 has a tapered shape which becomes wider toward the upper end.

Thus, the lubricating oil 46 dripped on the gap can be guided downward not only by the gravity but also by the capillary force. As a result, the lubricating oil 46 can be guided efficiently to the further end of the gap to fill the bearing with the lubricating oil 46.

(3)

As shown in FIG. 3, in the hydrodynamic bearing device 4 of the present embodiment, the gap formed between the outer peripheral surface of the first thrust flange 41b and the inner peripheral surface of the outer sleeve 44 has a tapered shape which becomes wider toward the lower end.

Thus, the lubricating oil 46 filled in the lower portion of the hydrodynamic bearing device 4 can be held by the capillary force which is in effect in the upward direction that the gap becomes narrower so as not to leak out from the lower portion due to the gravity. As a result, the lubricating oil 46 can be prevented from leaking out from the lower portion of the hydrodynamic bearing device 4.

(4)

As shown in FIG. 3, in the hydrodynamic bearing device 4 of the present embodiment, the lube repellant 11e and 11f are applied near the lower end of the gap formed between the outer peripheral surface of the first thrust flange 41b and the inner peripheral surface of the outer sleeve 44.

Thus, the lubricating oil 46 can be effectively prevented from leaking out from the lower portion of the hydrodynamic bearing device 4 by the lube repellant 11e and 11f in addition to the leakage prevention of the lubricating oil 46 by the capillary force as described above.

(5)

As shown in FIG. 4A, in the hydrodynamic bearing device 4 of the present embodiment, the crossing angle of the surface where the lube repellants 11a through 11f are applied and non-application surface in the boundary is smaller than the angle of contact of the lube repellants 11a through 11f with the application surface when the lube repellants 11a through 11f are in the liquid form, which is 60 degrees.

Thus, movement of the lubricating oil 46 between the application surface and the non-application surface can be effectively suppressed. The upper limit of the crossing angle is set to 60 degrees. This allows suppressing a burr to be generated during processing.

(6)

As shown in FIG. 3, the hydrodynamic bearing device 4 of the present embodiment includes the circular groove 12a formed on the outer peripheral surface of the second thrust flange 41c. The lube repellant 11b is applied to the inside of the circular groove 12a.

Thus, the movement of the lubricating oil 46 in the upward direction in the portion where the circular groove 12a crosses with the seal surface below can be suppressed, and the lube repellant 11b also suppresses the upward movement of the lubricating oil 46. As a result, the leakage of the lubricating oil 46 from the upper portion of the hydrodynamic bearing device 4 can be effectively suppressed.

(7)

The hydrodynamic bearing device 4 of the present embodiment includes the circular grooves 12a and 12b and the circular grooves 12c and 12d respectively formed on the outer peripheral surfaces of the first and the second thrust flanges 41b and 41c and the inner peripheral surface of the outer sleeve 44 which form the gaps to become the tapered seal portions. The circular grooves 12a and 12b and the circular grooves 12c and 12d are on the surfaces opposing each other, but the positions in the height direction are shifted.

Thus, it is possible to prevent a bubble from being generated in the circular grooves 12a through 12d even when the hydrodynamic bearing device 4 is subjected to a rapid decompression with the lubricating oil 46 being filled in a cavity formed by the two opposing circular grooves. As a result, problems such as rising of the liquid surface of the lubricating oil 46 or leakage due to a presence of a bubble in the lubricating oil 46 can be prevented.

(8)

As shown in FIG. 3, in the hydrodynamic bearing device 4 of the present embodiment, the circular grooves 12c and 12d are formed on both surfaces which form the gap corresponding to the tapered seal portion in the lower portion of the hydrodynamic bearing device 4 (between the first thrust flange 41b and the outer sleeve 44). The lube repellants 11e and 11f are applied on the surfaces from the inside of the circular grooves 12c and 12d to the lower portion in the axial direction.

Thus, with combinations of the circular grooves 12c and 12d and the lube repellants 11e and 11f, the lubricating oil 46 can be effectively prevented from leaking out in the downward direction from the gap formed between the first thrust flange 41b and the outer sleeve 44.

(9)

As shown in FIG. 3, in the hydrodynamic bearing device 4 of the present embodiment, the lube repellant 11c is applied in a circular shape along a surface corresponding to the upper end of the outer sleeve 44 which is placed above the gap formed between the second thrust flange 41c and the outer sleeve 44.

Thus, as shown in FIG. 5A, even when a large amount of the lubricating oil 46 is dripped to the gap formed between the second thrust flange 41c and the outer sleeve 44, the lube repellant 11c serves as a bulwark and can prevent the lubricating oil 46 from leaking outside the lube repellant 11c in the radial direction.

(10)

Figure 9:
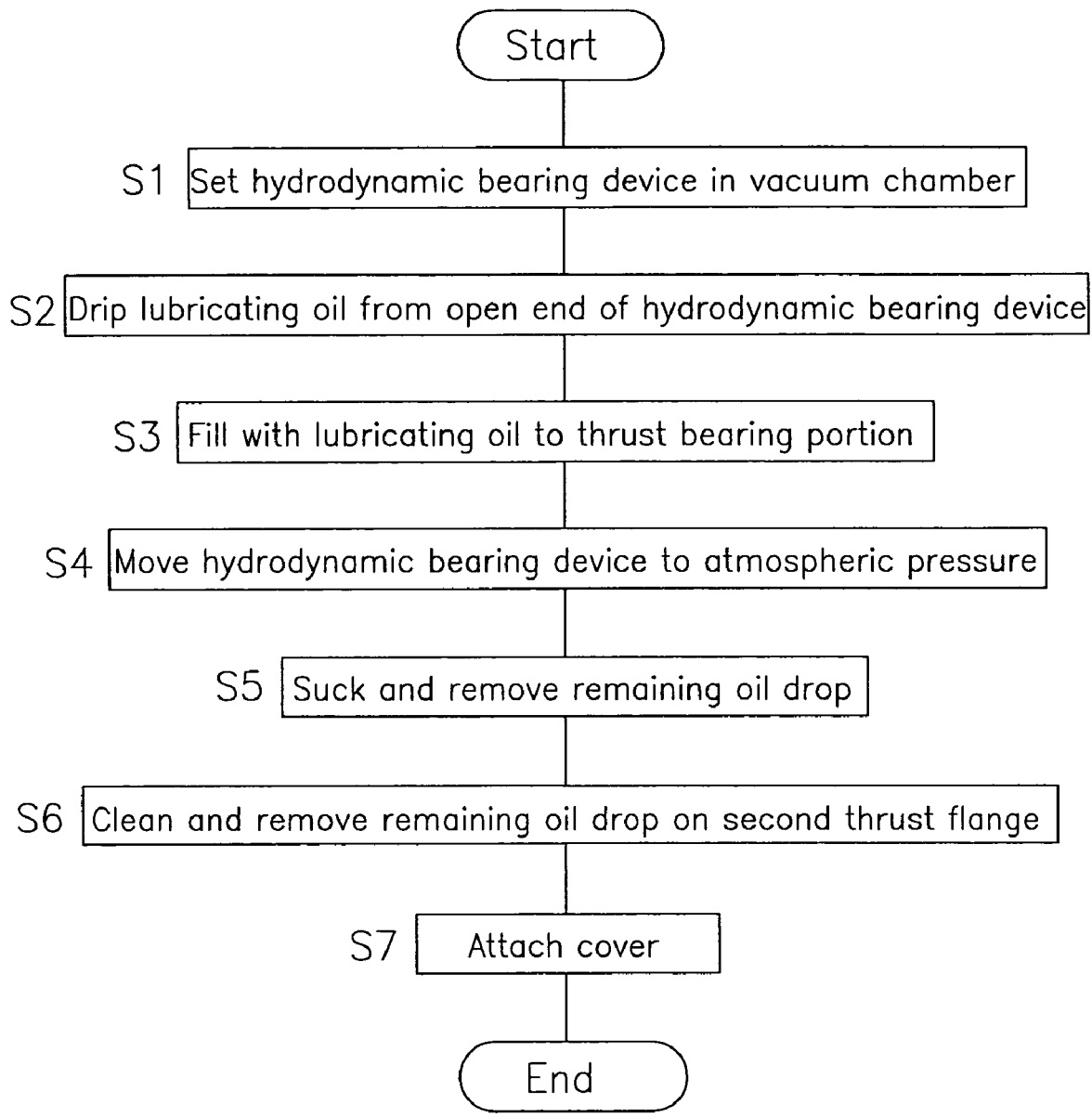
FIG. 9 is a flow diagram showing a process for manufacturing the hydrodynamic bearing device of FIG. 2.

In the method for manufacturing the hydrodynamic bearing device 4 of the present embodiment, at step S3 of FIG. 9, the lubricating oil 46 is filled to the portion around the thrust bearing portions 72 and 73 of the hydrodynamic bearing device 4 under vacuum condition (decompressed condition) as shown in FIG. 7A. Then, at step S4 of FIG. 9, the hydrodynamic bearing device 4 is put under atmospheric pressure condition.

Thus, the lubricating oil 46 which has been filled as shown in FIG. 7A is now filled as shown FIG. 7B. The lubricating oil 46 is sufficiently spread to the position of the radial bearing portion 72. In this way, the hydrodynamic bearing device 4 can be efficiently filled with the lubricating oil 46.

(11)

As shown in FIGS. 4A through 4C, the hydrodynamic bearing device 4 of the present embodiment includes the seal surface and the non-seal surface to which the lube repellants 11A through 11F are applied which satisfy the conditions described below on the surfaces forming the gaps corresponding to the tapered seal portions in the upper and lower portions of the hydrodynamic bearing device 4 (between the first thrust flange 41b and the outer sleeve 44 and between the second thrust flange 41c and the outer sleeve 44). That is, the crossing angle β at the boundary between the seal surface and the non-seal surface is larger than the angle of contact α of the lube repellants 11A through 11F with the non seal surface and is not larger than 60 degrees under the condition that the viscosity of the lube repellants 11A through 11F in the liquid form before curing is 80 mPa·S at 25° C.

Thus, between the seal surface and the non-seal surface, the movement of the lubricating oil 46 from the seal surface to the non-seal surface can be effectively suppressed by the crossing angle of the lube repellants 11A through 11F and seal surface with the non-seal surface. At the same time, it is also possible to prevent an extra lube repellant from attaching to the seal surface from the non-seal surface during the lube repellants 11A through 11F being applied and to precisely define the non-seal surface near the liquid surface of the lubricating oil 46.

As a result, the hydrodynamic bearing device 4 having a sufficient sealing effect is formed, and shortening of the life of the bearing caused by evaporation of the lubricating oil 46 can be avoided.

(12)

For the hydrodynamic bearing device 4 of the present embodiment, the surface roughness Rz (maximum height) of the seal surface to which the lubricating oil 46 contacts is set to be 4.0 or less based on the experimentation results shown in FIGS. 8A through 8F.

Thus, it becomes possible to suppress the movement of the lubricating oil 46 toward the non-seal surface without having a very large crossing angle at the boundary between the seal surface and the non-seal surface. Therefore, the lubricating oil 46 can be prevented from leaking out more effectively even when the conditions in application of the lube repellants 11A through 11F and the formation angles of the circular grooves 12a through 12d are eased.

(13)

As shown in FIG. 3, in the hydrodynamic bearing device 4 of the present embodiment, the circular grooves 12a, 12c, and 12d having a cross-section radius of 50 μm or longer are formed on the non-seal surface where the lube repellants 11b, 11e and 11f are applied.

Thus, on the non-seal surface side, the movement of the lubricating oil 46 can be suppressed at the circular grooves 12a, 12c, and 12d. Accordingly, the movement of the lubricating oil 46 from the seal surface to the non-seal surface can be effectively prevented.

Since the circular grooves 12a, 12c and 12d are smooth grooves having the cross-section radius of 50 μm or longer, even when there is a bubble in the circular grooves 12a, 12c and 12d, it can be smoothly discharged outside the bearing.

Further, by forming the circular grooves 12a, 12c and 12d having the cross sections of arc shapes, an amount of burrs produced can be reduced compared to a conventional rectangular groove. Thus, frequency that problems such as entering of a burr into the bearing portions 71 through 73 or contamination occur can be lowered.

(14)

As shown in FIG. 3, in the hydrodynamic bearing device 4 of the present embodiment, the circular groove 12b having a cross-section radius of 50 μm or longer is formed on the seal surface where the lube repellants 11A through 11F are not applied.

Thus, on the seal surface side, the movement of the lubricating oil 46 can be suppressed at the circular groove 12b.

Accordingly, the movement of the lubricating oil 46 from the seal surface to the non-seal surface can be effectively prevented.

Since the circular groove 12b is a smooth groove having the cross-section radius of 50 μm or longer, even when there is a bubble in the circular groove 12b, it can be smoothly discharged outside the bearing.

Further, by forming the circular groove 12b having the cross section of an arc shape, an amount of burrs produced can be reduced compared to a conventional rectangular groove. Thus, frequency that problems such as entering of a burr into the bearing portions 71 through 73 or contamination occur can be lowered.

(15)

In the hydrodynamic bearing device 4 of the present embodiment, the surface roughness at the seal surface to which the lubricating oil 46 contacts in a normal state of use is formed to be smaller than the surface roughness at the non-seal surface to which the lube repellants 11A through 11F are applied.

Thus, the lubricating oil 46 is more wettable on the non-seal surface, but the movement of the lubricating oil 46 to the non-seal surface is suppressed by the lube repellants 11A through 11F, the circular grooves 12a through 12d, and the like. Thus, the lubricating oil 46 can be maintained in the form of drops within the seal surface. Within the seal surface, the lubricating oil 46 does not spread so much. Accordingly, evaporation of the lubricating oil 46 can be prevented from speeding up.

Embodiment 2

A spindle motor 80 including a hydrodynamic bearing device according to another embodiment of the present invention will be described as follows with reference to FIGS. 11 and 12A through 12C. The members which have common functions as described in the embodiment 1 will not be described below

[Structure of Entire Spindle Motor 80]

Figure 11:
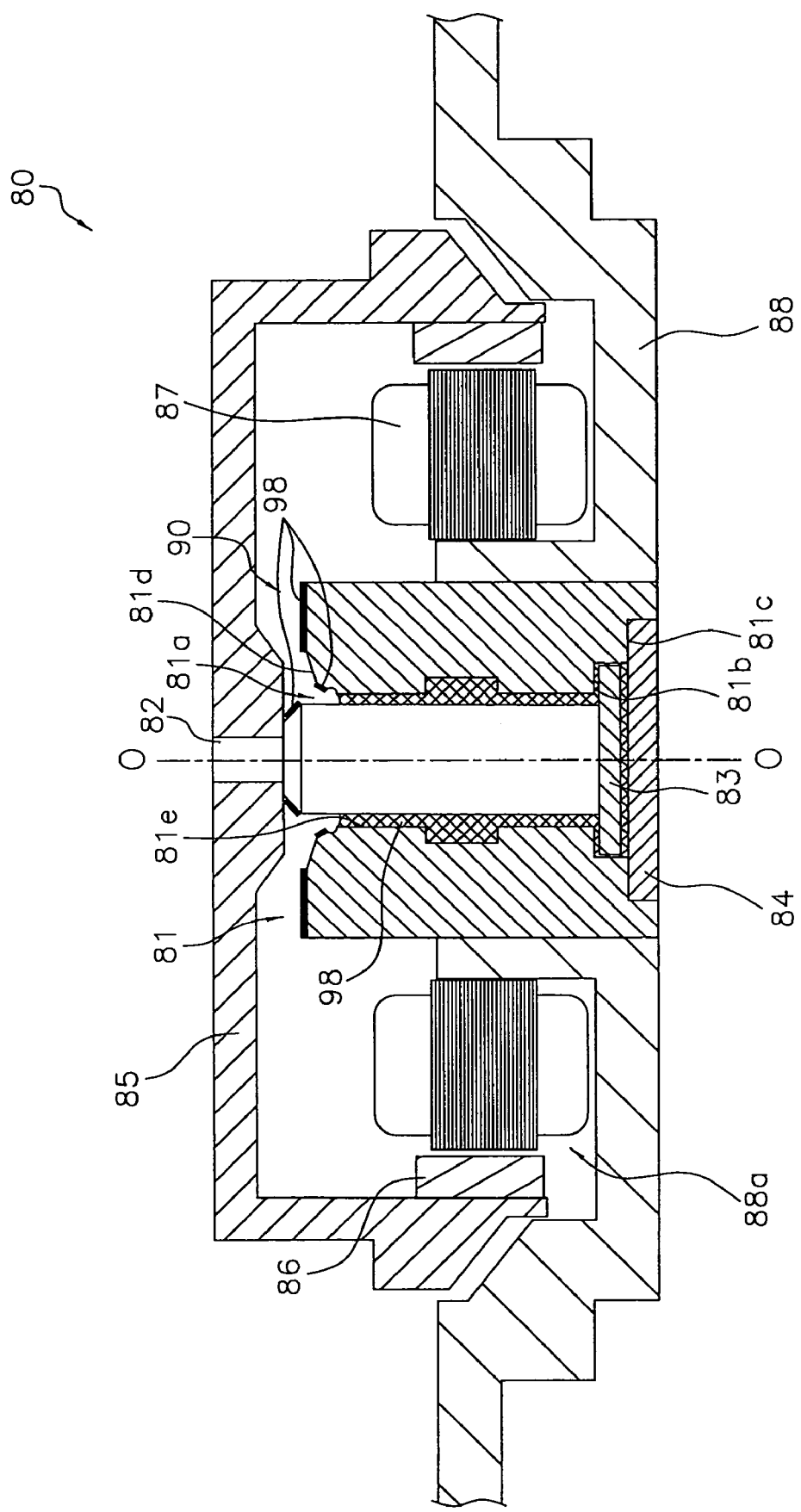
FIG. 11 is a cross-sectional view showing a structure of a hydrodynamic bearing device according to another embodiment of the present invention.

As shown in FIG. 11, the spindle motor 80 according to the present embodiment includes a rotor hub 85, a rotor magnet 86, a stator 87, a base 88 and a hydrodynamic bearing device 90 and the like.

The hydrodynamic bearing device 90 has a sleeve (fixed portion) 81, a shaft (rotating portion) 82, a thrust flange (rotating portion) 83, and a thrust plate (fixed portion) 84.

The sleeve 81 having a bearing hole 81a is formed of a sintered material (also referred to as a sintered metal) obtained by sintering metal powder including at least one of iron, iron alloy, copper and copper alloy, and is fixed to a base 88. The sleeve 81 also includes a first step portion 81b which opposes a perimeter portion of the thrust flange 83. The perimeter portion of the thrust flange 83 and the first step portion 81b are placed with a gap interposed therebetween. Further, the sleeve 81 includes a second step portion 81c having a diameter larger than that of the first step portion 81b. The thrust plate 84 having a disc shape is fixed to the second step portion 81c by a method such as adhering, caulking, press-fitting and welding or the like. On an upper end of the sleeve 81, an inclined surface 81d is formed, and lubricating oil (lubricant) 96 is prevented from leaking out from the bearing portion by a capillary sealing effect.

Further, an inner peripheral surface 81e of the bearing hole 81a of the sleeve 81 extends in an axial direction with a step portion being formed in a central part. On the inner peripheral surface 81e of the bearing hole 81a, radial dynamic pressure generating grooves having a herringbone pattern are formed in line in the axial direction between the step portion 81b and a circular inclined surface 81d. On the upper portion of the sleeve 81 in the axial direction, lube repellants (a first lube repellant and a second lube repellant) 98 are applied. At the position corresponding to an upper portion of a radial bearing gap 97 formed with an outer peripheral surface of the shaft 82, a circular groove 91 is formed along a lower edge of the lube repellant (second lube repellant) 98c. Since the sleeve 81 is made of an iron sintered material, it can be manufactured at low cost by using a mold or the like for shaping. The sintered material is treated with nickel plating or the like on its surface to fill minute holes.

The shaft 82 is a member having an outer peripheral surface of a cylindrical shape (for example, pillar member or cylindrical member) formed of a metal material which is not a sintered material, and inserted into the bearing hole 81a so as to be rotatable. In the upper portion of the shaft 82, a tapered portion 82a (see FIG. 12A and others) which will be described below is formed. The lube repellants 98 are applied thereon. Since the shaft 82 is used as a central axis for rotation, hard materials such as SUS and the like is used, and is processed with a casting tool or the like.

The thrust flange 83 is a disc-shape member, and is attached to a lower end of the shaft 82 by a method such as adhering, press-fitting, caulking, welding, screwing, or the like. The thrust flange 83 is accommodated in a space defined by the step portion 81b of the sleeve 81 and the thrust plate 84 which is a thrust bearing member. A lower surface of the thrust flange 83 opposes the thrust plate 84, and a portion around the upper surface opposes the step portion 81b of the sleeve 81. Further, on the surface of the step portion 81b of the sleeve 81 which opposes the upper surface of the thrust flange 83, thrust dynamic pressure generating grooves are formed.

The thrust plate 84 is a member having a substantially disc shape and is attached to cover the lower portion of the hydrodynamic bearing device 90. On an upper surface thereof, thrust dynamic pressure generating grooves are formed. The thrust dynamic pressure generating grooves do not have to be provided on this surface as long as they are formed on either one of the members opposing each other in the axial direction to farm the gap. Specifically, the thrust dynamic pressure generating grooves may be formed on the lower surface of the thrust flange 83, or the upper surface of the thrust flange 83.

The rotor hub 85 has a substantially bowl shape and a penetrating hole in a substantially central portion to which the upper end of the shaft 82 is fixed by a method such as press-fitting, adhering, welding, or the like. On the rotor hub 85, a rotor magnet 86 of the spindle motor is attached so as to oppose the stator 87 in the radial direction. To the rotor hub 85, a magnetic recording disc or the like which is not shown is fixed, and the rotor hub 85 forms a magnetic recording and reproduction apparatus such as a hard disc device as a whole together with other members.

The lubricating oil 96 is filled between the shaft 82 and the bearing hole 81a of the sleeve 81, between the thrust flange 83 and the sleeve 81, and between the thrust flange 83 and the thrust plate 84, which include radial dynamic pressure generating grooves 89a and 89b and thrust dynamic pressure generating grooves 90a and 90b.

The rotor magnets 86 are attached on the inner peripheral surface of the rotor hub 85 in equal intervals in a circumferential direction. The rotor magnets 86 repeat attracting and repelling with the opposing stator 87 to rotate the rotor hub 85 with the shaft 82 being a center.

The base 88 has a recessed portion 88a for accommodating the motor portion. In a substantially central portion of the recessed portion 88*a*, a hole 88*b* for fixing the sleeve 81 is provided. In a portion which forms the hole 88*b* of the base 88, the stator 87 formed of cores with coils wound around is fixed by a method such as adhering.

[Structure for Preventing Leakage of the Lubricating Oil 96 in the Hydrodynamic Bearing Device 80]

As shown in FIG. 11, the spindle motor 80 of the present embodiment is a motor including a bearing of an shaft rotation type and one-end open tripe in which a portion where the lube repellant 98 is not applied is provided between the upper surface of the sleeve 81 and a sealing wall surface of the lubricating oil 96 (in this example, an inclined surface 81*d* having a gentle slope of about 15 degrees toward the bearing sealing gap).

Hereinafter, the structure for preventing the leakage of the lubricating oil 96 filled in the hydrodynamic bearing device 90 having the above-described structure will be described with reference to FIGS. 12A through 12C.

In the hydrodynamic bearing device 90 with the lubricating oil 96 being injected, the rotor hub 85 is fixed to the shaft 82 by press-fitting, adhering, laser welding or the like. On the upper end of the shaft 82, a screw hole is provided, and a disc damper (not shown) for fixing a recording disc (not shown) is fixed.

The hydrodynamic bearing device 90 incorporated into the spindle motor 80 of the present embodiment employs a structure, which will be described below, in order to prevent leakage of the filled lubricating oil 96.

Figure 12A:
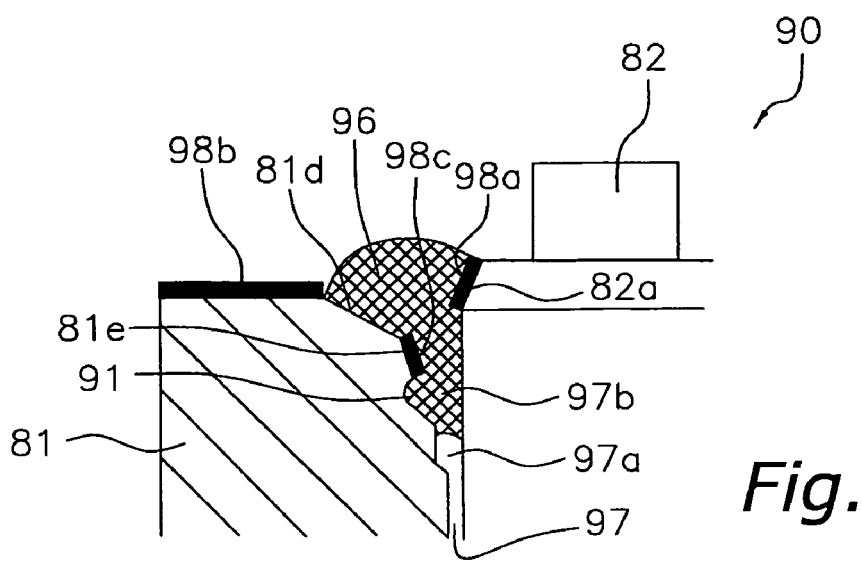
FIGS. 12A through 12C are enlarged views showing a process for injecting lubricating oil in the hydrodynamic bearing device of FIG. 11.

Specifically, as shown in FIG. 12A, a tapered portion 82*a* inclined by 18 degrees with respect to the axial direction is formed on the upper end of the shaft 82. On a surface of the tapered portion 82*a*, a lube repellant (a fourth lube repellant) 98*a* is applied. The lube repellants 98 are applied only to the tapered portion 82*a*, and are not applied to a cylindrical surface and a shoulder portion to which the rotor hub 85 is to be mounted. As shown in FIG. 12B, the tapered portion 82*a* is separated by δ from an upper edge of a non-sealing wall surface to which the lube repellant (the second lube repellant) 98*c* is applied in the bearing seal portion toward the outside of the bearing.

Near the open end of the sleeve 81, a lubricating oil pool 97*a*, a buffer portion 97*b* which is a space extended when the circular groove 91 is formed and serves as a buffer when the lubricating oil 96 expands, and an applied portion 81*e* to which the lube repellant 98*c* is applied are provided in the radial bearing gap 97. Further, a lube repellant (the first lube repellant) 98*b* is applied to a plane surface of the upper end of the sleeve 81.

A method for injecting the lubricating oil 96 into the hydrodynamic bearing device 90 having the above-described structure will be described.

The hydrodynamic bearing device 90 is placed under vacuum condition to remove air. Then, under such a circumstance, a predetermined amount of the lubricating oil 96 is injected aiming at the inclined surface 81*d* on the open end to which the lube repellant is not applied. At this time, the lubricating oil 96 rises as shown in FIG. 12A. However, lubricating oil 96 can be prevented from flowing out toward the inside and the outside in the radial direction having the shaft 82 as a center by the lube repellant 98*b* applied to the upper end surface of the sleeve 81 and the lube repellant 98*a* applied to the tapered portion 82*a* of the shaft 82.

Figure 12B:
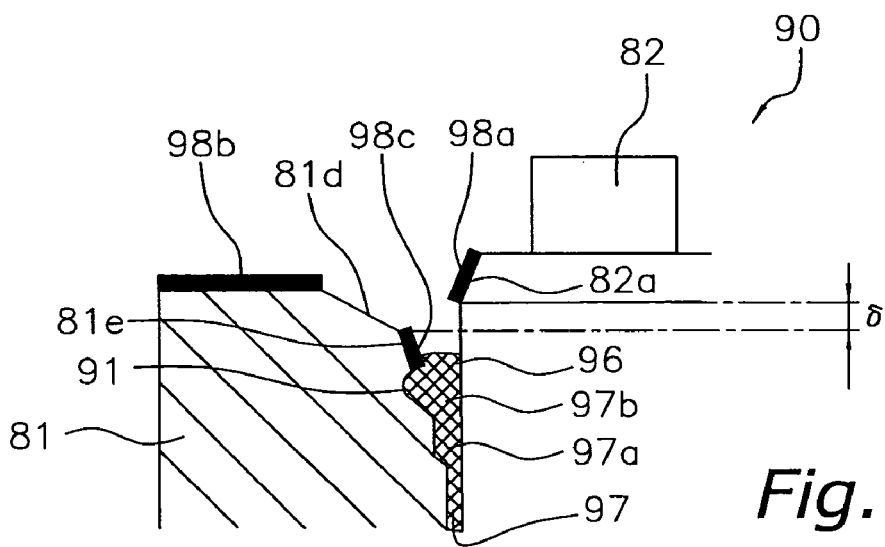
Figure 12C:
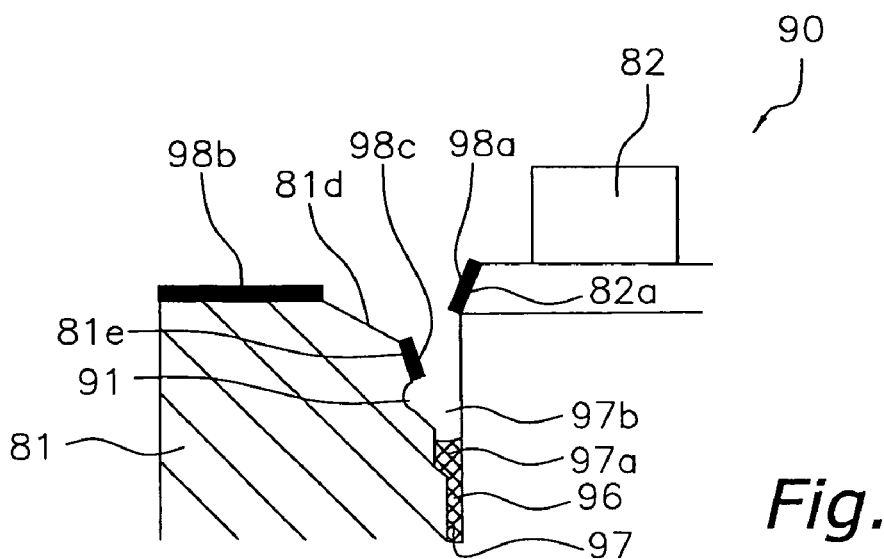

As the lubricating oil 96 moves toward the inside of the radial bearing gap 97 by running down the sealing wall surface little by little as shown in FIG. 12B, the gap becomes smaller. Thus, the lubricating oil 96 is sucked into the bearing by a capillary force. Inside the bearing; a gap larger than the radial bearing gap 97 is formed. Thus, penetration of the lubricating oil 96 by the capillary phenomenon stops there.

Then, the hydrodynamic bearing device 90 which has been placed under vacuum condition is exposed to the atmospheric pressure condition. Thus, the lubricating oil 96 is pushed by the atmospheric pressure, and the lubricating oil 96 has a predetermined level of the liquid surface as shown in FIG. 12C. In some cases, the lubricating oil 96 may be supplied slightly more than a required amount, and the extra lubricating oil 96 may be sucked later for adjustment.

In the present embodiment, the lube repellants 98*a* through 98*c* for preventing leakage of the lubricating oil 96 are applied in the upper open end of the hydrodynamic bearing device 90 as described above. The circular groove 91 is formed along the lower edge of the portion to which lube repellant 98*c* is applied.

By applying the lube repellants 98*a* through 98*c* just above the seal portion to which the lubricating oil 96 is filled and forming the circular groove 91 as described above the movement of the lubricating oil 96 to the upper portion in the axial direction can be suppressed to effectively prevent leakage of the lubricating oil 96.

Further, when the lubricating oil 96 is being filled, the movement of the lubricating oil 96 toward both the inside and the outside in the radial direction can be suppressed even when a larger amount of drops compared to normal amount is injected as shown in FIG. 12A, and the side of the hydrodynamic bearing device 90 for injection can be prevented from being stained by the lubricating oil 96.

[Features of the Present Hydrodynamic Bearing Device 90]

(1)

As shown in FIG. 12A, in the hydrodynamic bearing device 90 of the present embodiment, the lube repellants 98*b* and 98*c* are applied to the upper end surface of the sleeve 81 and the application surface 81*e* which is provided below with the inclined surface 81*d* interposed therebetween.

Thus, for injecting the lubricating oil 96 to the radial bearing gap 97 formed between the sleeve 81 and the shaft 82, even when the lubricating oil 96 is injected in an amount larger than required, aiming around the inclined surface 81*d* as shown in FIG. 12A, the lubricating oil 96 can be prevented from leaking to the outside in the radial direction by the lube repellant 98*b*.

Once the lubricating oil 96 is filled, leakage of the lubricating oil 96 can be prevented by suppressing the movement of the lubricating oil 96 to the upper portion in the axial direction by the lube repellant 98*c*. Further, a predetermined space corresponding to the inclined surface 81*d* is provided between the lube repellants 98*b* and 98*c*. Thus, the remaining oil drops after filling of the lubricating oil 96 can be gathered to the inclined surface. As a result, it is possible to prevent the lubricating oil 96 from spreading on the surface of the sleeve 81 and speeding up the rate of evaporation, and to efficiently perform the operation to wipe off the remaining drops of the lubricating oil 96 after the filling is finished.

(2)

In the hydrodynamic bearing device 90 of the present embodiment, the lube repellant 98*a* is applied to the tapered portion 82*a* of the shaft 82.

Accordingly, the lubricating oil 96 does not enter a screw hole or the like formed on the tip of the shaft 82. Thus, the wiping off operation can be easily performed.

(3)

The hydrodynamic bearing device 90 of the present embodiment also has the circular groove 91 as the hydrodynamic bearing device 4 of the above-described Embodiment 1.

Thus, as described in Embodiment 1, by making the crossing angle at the position where the circular groove and the sealing wall surface contact each other satisfy the predetermined conditions, similar effects as those achieved in the hydrodynamic bearing device 4 can be achieved.

Other Embodiments

Embodiments of the present invention have been described above. However, the present invention is not limited to the above embodiments but may be varied within the scope of the invention.

(A)

In Embodiment 1, the lube repellants 11a and 11b are applied to the upper end surface (first surface) of the second thrust flange 41c and the wall surface on the outer peripheral surface in the radial direction. However, the present invention is not limited to such an example.

Figure 13A:
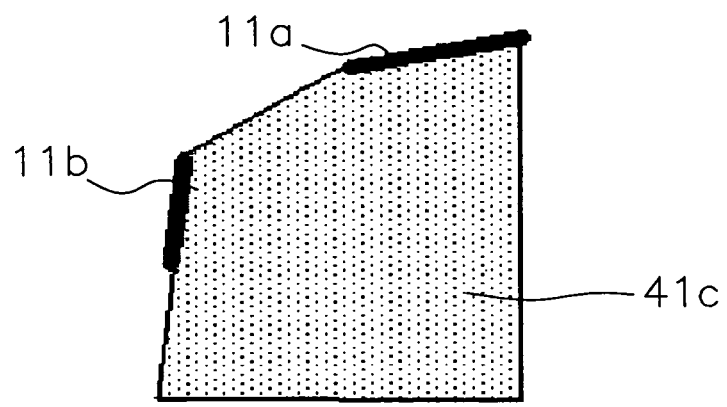
FIGS. 13A through 13C are schematic diagrams showing a variety of a first surface portion included in a hydrodynamic bearing device according to yet another embodiment of the present invention.
Figure 13B:
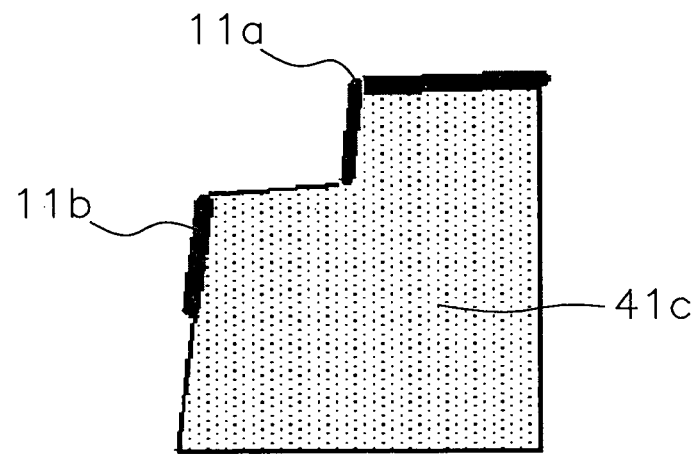
Figure 13C:
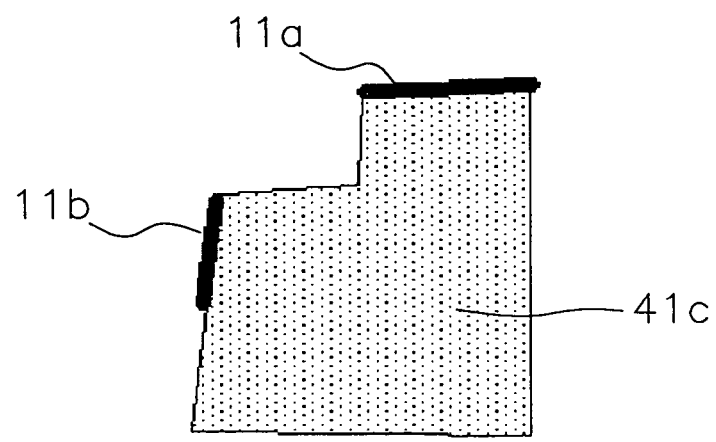

For example, the first surface may be inclined as shown in FIG. 13A, or may be provided with steps as shown in FIGS. 13B and 13C. The lube repellants 11a and 11b may be applied in any way as long as the lube repellant 11a is applied on the first surface with a predetermined space being secured from the lube repellant 11b.

(B)

In Embodiment 1, the present invention is applied to the hydrodynamic bearing device of the shaft fixed type and both-end open type, and in Embodiment 2, the present invention is applied to the hydrodynamic bearing device of the shaft rotation type and one-end open type. However, the present invention is not limited to such examples.

Figure 14:
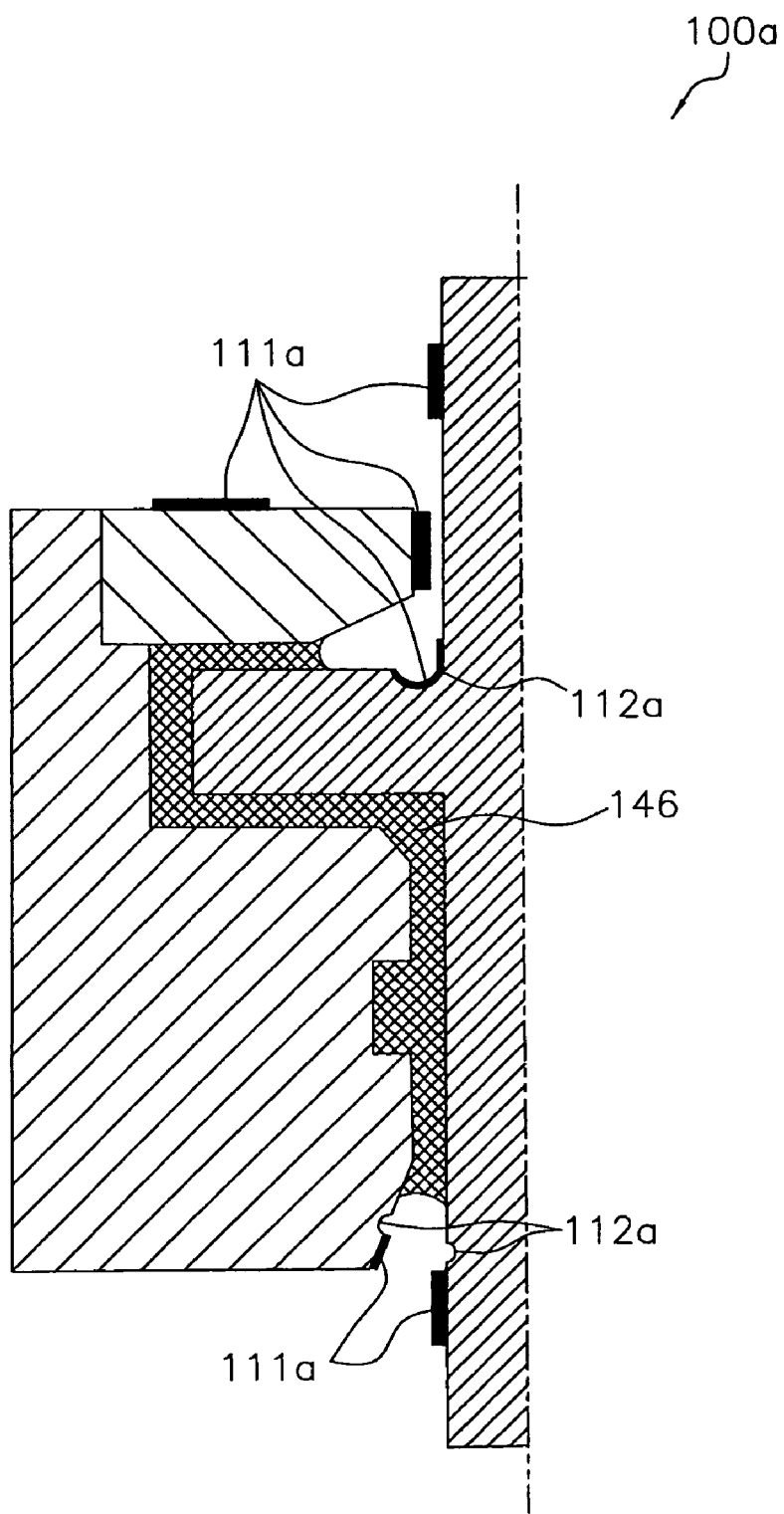
FIG. 14 is a partial cross-sectional view showing a structure of a hydrodynamic bearing device according to yet another embodiment of the present invention.
Figure 15:
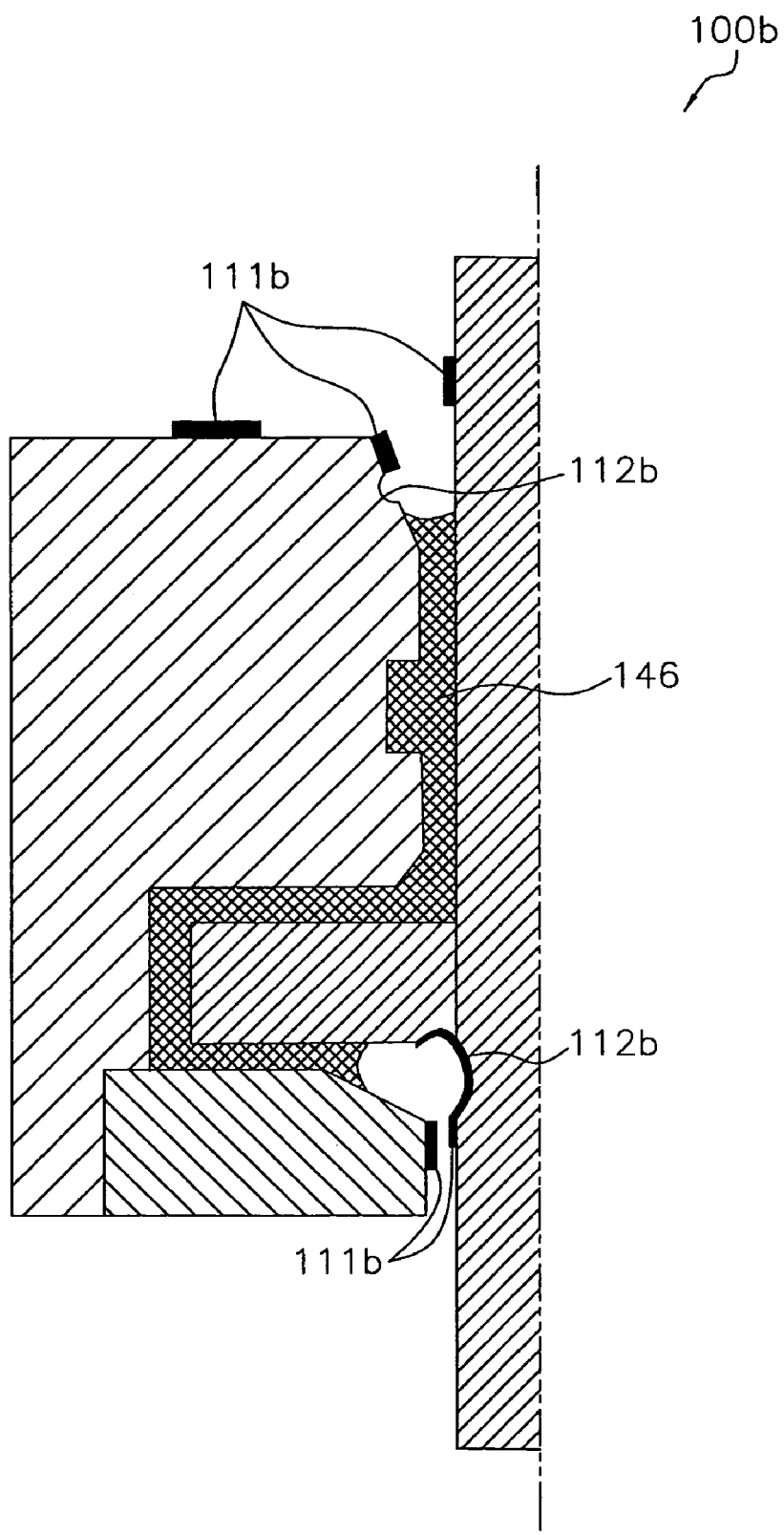
FIG. 15 is a partial cross-sectional view showing a structure of a hydrodynamic bearing device according to yet another embodiment of the present invention.
Figure 16:
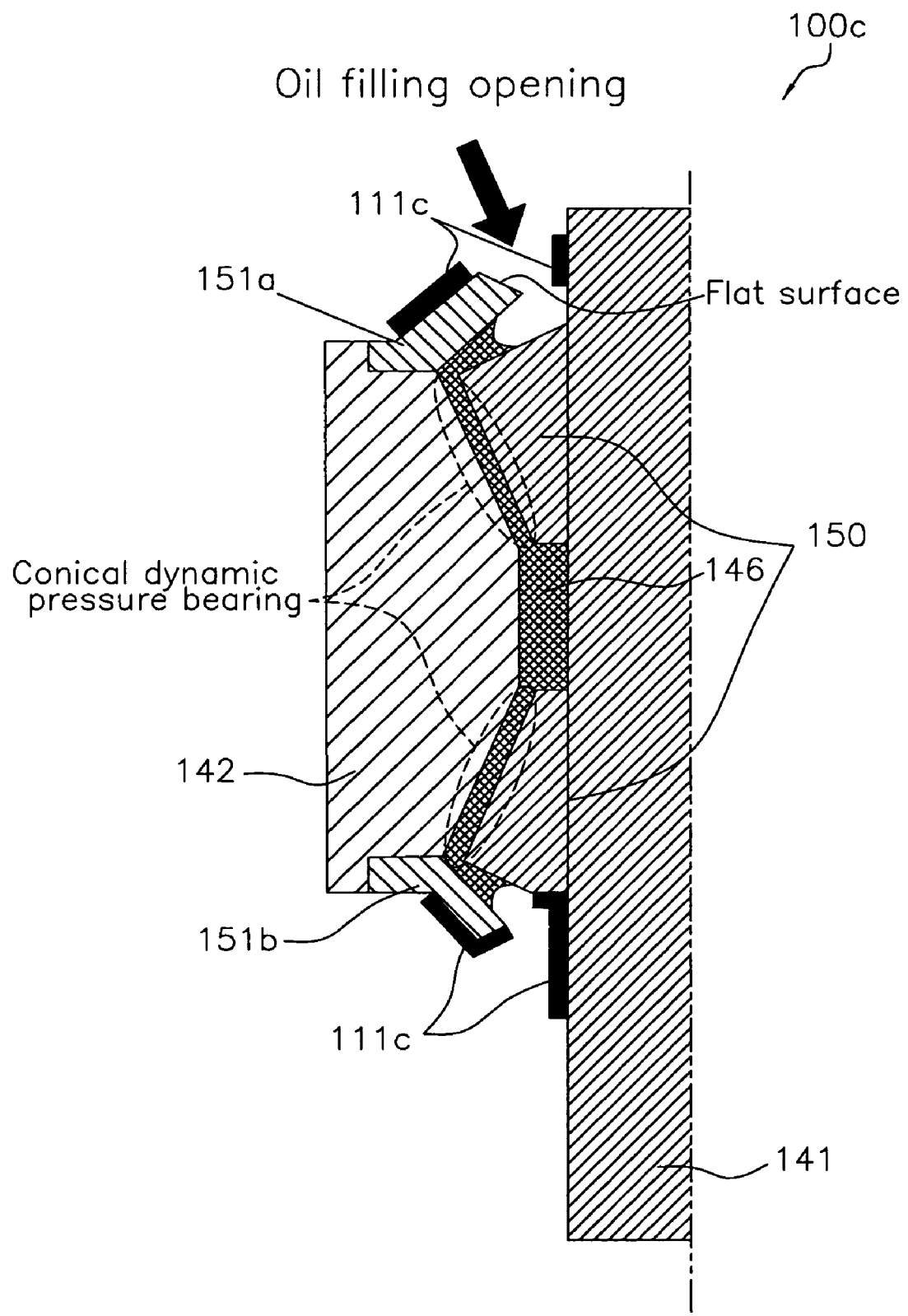
FIG. 16 is a partial cross-sectional view showing a structure of a hydrodynamic bearing device according to yet another embodiment of the present invention.

The present invention can be applied to a wide variety of the hydrodynamic bearing devices, for example, hydrodynamic bearing devices 100a through 100c as shown in FIGS. 14 through 16 of the shaft fixed type, shaft rotation type, both-end open type, one-end open type and the like. The effects similar to those of as described in the above embodiments, for example, improving workability for injecting the lubricating oil 146 or preventing leakage can also be achieved by providing the lube repellants 111a through 111c and the circular grooves 112a and 112b when the present invention is applied to any of the hydrodynamic bearing devices 100a through 100c.

Particularly, in the hydrodynamic bearing device 100c shown in FIG. 16, tapered cones 150 are press-fitted to the shaft 141 with a predetermined gap from a recessed portion of the sleeve 142. A conical bearing includes spiral dynamic pressure grooves for generating dynamic pressure in a direction to pump the lubricant toward the inner periphery of the bearing. The conical bearing handles the forces in both the radial direction and the thrust direction at the same time. Between seal covers 151a and 151b and the tapered cones 150, there are tapered sealing structure with the gaps becoming wider toward the outside the bearing, which provide a sealing function to prevent leakage of lubricating oil 146 of the bearing. An upper edge of the upper seal cover 151a has a relatively flat surface. The lubricating oil 146 is injected to the surface to prevent the lubricating oil 146 from being spilled over the outer periphery of the sleeve 142.

Figure 17A:
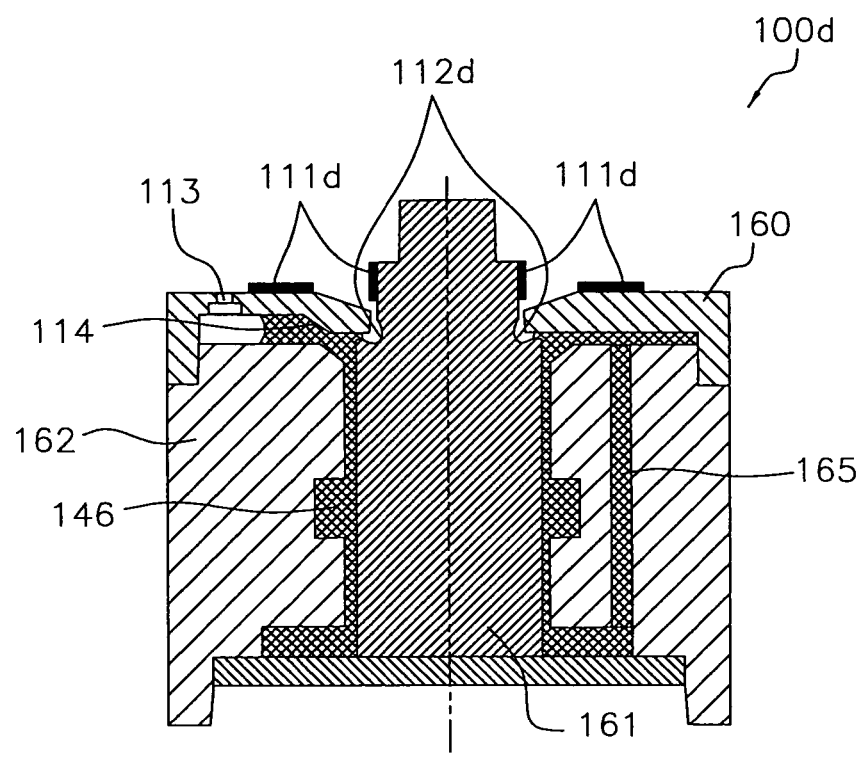
FIGS. 17A and 17B are respectively a cross sectional view and a plan view showing a structure of a hydrodynamic bearing device according to yet another embodiment of the present invention.
Figure 17B:
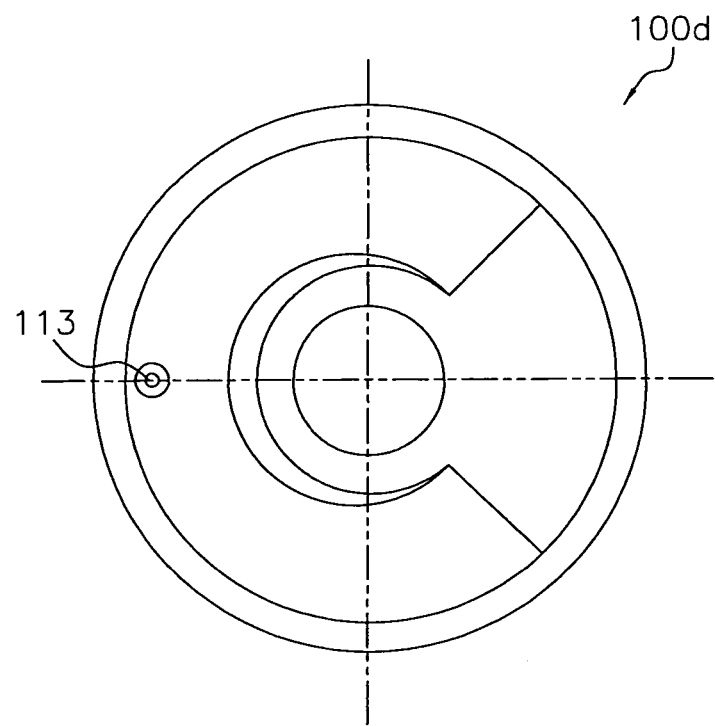

Further, the present invention may be applied to the hydrodynamic bearing device 100d as shown in FIGS. 17A and 17B.

In the hydrodynamic bearing device 100d shown in FIGS. 17A and 17B, a top seal 160 made of a resin, which also serves as a stopper for the shaft 161, is provided. The seal cap 160 provides a sealing function with a shoulder portion of a shaft 161 at the innermost periphery close to the shaft 161. A variance in the amount of the lubricating oil 146 is adsorbed by liquid surface change of the lubricating oil 146 near a vent 113 provided on a top surface of the seal cap 160. Further, the seal cap 160 also provides a sealing function in between an inclined surface 114 and a sleeve 162 on the seal surface side, and has a structure such that the lubricating oil 146 does not leak from the vent 113.

A communicating hole 165 provided along the axial direction makes the pressure at the thrust bearing at the lower end of the shaft 161 same as that at the upper end of the radial bearing. The communicating hole 165 and the vent 113 of the seal cap 160 are in the opposite phases with respect to the rotational axis by 180 degrees. A thrust flange may be provided under the shaft 161 to serve as a stopper and the thrust bearing.

(C)

In Embodiments 1 and 2, the lubricating oil 46 and 96 are injected from the upside of the hydrodynamic bearing device and the hydrodynamic bearing device is used with the injection side being the upside as shown in FIGS. 6A, 12A and the like. However, the present invention is not limited to such examples.

Figure 18:
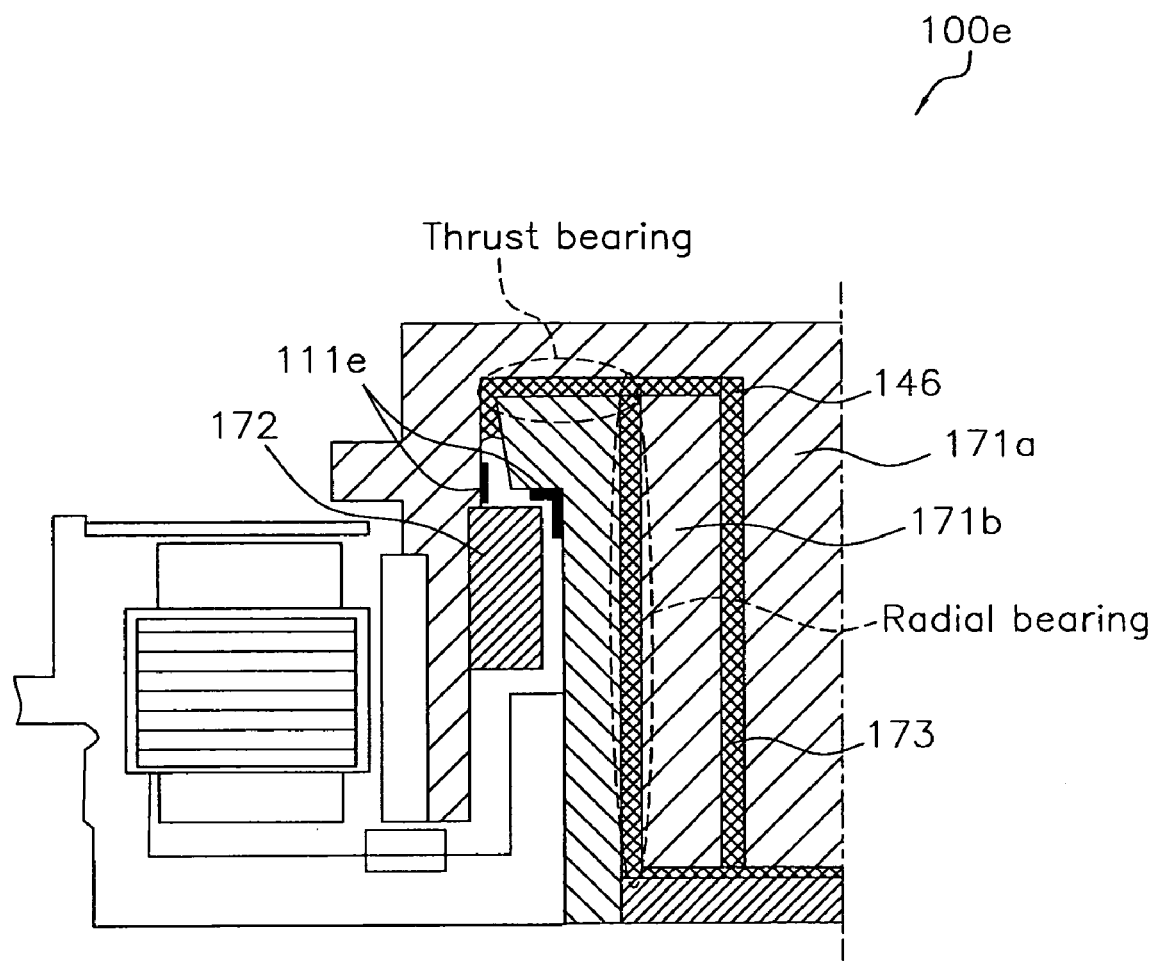
FIG. 18 is a partial cross-sectional view showing a structure of a hydrodynamic bearing device according to yet another embodiment of the present invention

For example, the direction of the hydrodynamic bearing device 100e may be changed from the state as shown in FIG. 18 to expose the lube repellant 111e, the lubricating oil 146 may be injected between the lube repellant 111e, and then, the hydrodynamic bearing device 100e may be reversed as shown in FIG. 18 for use.

When the lubricating oil 146 is injected, a stopper 172 shown in FIG. 18 is not fixed yet. After injection is completed, the stopper 172 is fixed near the lube repellant 111e. A sleeve 171b is fixed to a shaft 171a by press fitting. On the outer peripheral surface of the shaft 171a, a vertical groove 173, which communicates between the radial lower end and the thrust inner periphery, is provided.

(D)

In Embodiments 1 and 2, the lube repellants 11a through 11f and the lube repellants 98a through 98c are applied to predetermined application positions as shown in FIGS. 3A and 12A. However, the present invention is not limited to such examples.

For example, the positions to apply the lube repellants may be changed as appropriate in accordance with the level of the liquid surface of the lubricant.

(E)

In Embodiment 1 and Embodiment 2, the circular grooves 12a through 12d and the circular groove 91 are formed at predetermined positions as shown in FIGS. 3A and 12A. However, the present invention is not limited to such examples.

For example, the positions of the circular grooves may be changed as appropriate in accordance with the level of the liquid surface of the lubricant.

(F) In Embodiment 2, the tapered portion 82a of the shaft 82 is separated from the application portion 81e by distance δ in the radial direction. However, the present invention is not limited to such an example.

Such a structure is employed for facilitating a flow of the lubricating oil 96 to the bearing seal portion. In the case where the gap of the seal portion is large, such a structure is not necessary, and the tapered portion 82 and the application portion 81e may be positioned at almost the same height.

(G)

In Embodiments 1 and 2, the hydrodynamic bearing devices according to the present invention are incorporated into the spindle motor. However, the present invention is not limited to such examples.

The present invention is also applicable as a recording and reproduction apparatus including a spindle motor into which the hydrodynamic bearing device of the present invention is incorporated.

INDUSTRIAL APPLICABILITY

The present invention can be applied to a wide variety of the hydrodynamic bearing devices including a fluid inside, for example, those incorporated into an HDD spindle motor, a high-density optical disc spindle motor, and the like.

The invention claimed is:

1. A hydrodynamic bearing device, comprising:
a fixed portion;
a rotating portion which rotates with respect to the fixed portion;
a lubricant to be filled in a gap formed between the rotating portion and the fixed portion;
a dynamic pressure bearing portion for supporting the rotating portion so as to be rotatable with respect to the fixed portion with the lubricant interposed therebetween;
a first gap portion provided in an upper portion of the rotating portion in an axial direction and formed between the rotating portion and the fixed portion;
a first surface portion formed on either a part of the rotating portion or a part of the fixed portion which form the first gap portion in a position above the first gap portion in the axial direction;
a first lube repellant which is applied on the first surface portion in a circular shape with a space of a predetermined distance in a radial direction from an outer edge of the gap portion; and
a second lube repellant which is applied in a circular shape on either the rotation portion or the fixed portion at a position closer to an outer edge of the gap than the first surface portion within the first gap.

2. A hydrodynamic bearing device according to claim 1, wherein:
the first gap portion formed between the rotating portion and the fixed portion has a tapered shape with at least a part of the gap which becomes wider toward outside the dynamic pressure bearing portion.

3. A hydrodynamic bearing device according to claim 1, further comprising a second gap portion provided in a lower portion in the axial direction and is formed between the fixed portion and the rotating portion, wherein:
the second gap portion has a tapered shape with at least part of the gap which becomes wider toward outside the dynamic pressure bearing portion.

4. A hydrodynamic bearing device according to claim 3, wherein a third lube repellant is applied in a circular shape in a lower portion of the second gap portion.

5. A hydrodynamic bearing device according to claim 4, wherein an angle between at least one application surface from the first lube repellant through the third lube repellant and a non application surface is larger than an angle of contact between the lube repellant and the application surface when the lube repellant is in a liquid state.

6. A hydrodynamic bearing device according to claim 4, wherein:
a circular groove is formed in the second gap portion; and
the third lube repellant is applied to a portion from outside of the second gap portion to the circular groove or to outside of the circular groove in the axial direction.

7. A hydrodynamic bearing device according to claim 1, wherein:
a circular groove is formed on at least one of the rotating portion and the fixed portion in the first gap portion; and
the second lube repellant is applied to a portion which includes an outer edge of the first gap portion and is continuous to the circular groove or an upper edge of the circular groove in the axial direction.

8. A hydrodynamic bearing device according to claim 7, wherein the circular grooves are formed on both of the fixed portion and the rotating portion, and the circular grooves are formed on positions so as not to oppose each other.

9. A hydrodynamic bearing device according to claim 1, further comprising:
a second surface portion positioned above the first gap portion, and formed on either a part of the rotating portion or a part of the fixed portion which form the first gap portion; and
a fourth lube repellant applied in a circular shape on the second surface portion at a position spaced apart from the first surface portion toward upper portion in the axial direction.

10. A method for manufacturing a hydrodynamic bearing device according to claim 1, wherein:
the lubricant is supplied to between the first lube repellant and the first gap portion under a decompressed condition; and
the lubricant is made to permeate under a condition of a pressure higher than the decompressed condition.

11. A spindle motor comprising a hydrodynamic bearing device according to claim 1.

12. A recording and reproduction apparatus comprising a spindle motor according to claim 11.

13. A hydrodynamic bearing device, comprising:
a fixed portion;
a rotating portion which rotates with respect to the fixed portion;
a lubricant to be filled in a gap formed between the rotating portion and the fixed portion;
a dynamic pressure bearing portion for supporting the rotating portion so as to be rotatable with respect to the fixed portion with the lubricant interposed therebetween;
a seal surface which is positioned above the dynamic pressure bearing portion and is formed on at least one of the rotating portion and the fixed portion and has a seal function; and
a non-seal surface which is positioned to continue from the seal surface at a position above the seal surface and to which a lube repellant is to be applied, wherein
the lube repellant has a viscosity of 80 mPa·S or smaller at 25° C. in a liquid state before curing, and
an angle formed by the seal surface and the non-seal surface is larger than an angle of contact of the lube repellant with the non-seal surface when the lube repellant is in a liquid state before curing, and is 60 degrees or smaller.

14. A hydrodynamic bearing device according to claim 13, wherein the seal surface has a surface roughness in maximum height Rz(JIS B0601:2001) of 4.0 or smaller.

15. A hydrodynamic bearing device according to claim 13, wherein:
a circular groove which has one or more arc grooves having a cross-section radius of 50 μm or longer connected is formed on the seal surface; and
the non-seal surface and the circular groove form one continuous surface.

16. A hydrodynamic bearing device according to claim 13, wherein:
a circular groove which has one or more arc grooves having a cross-sectional radius of 50 μm or longer connected is formed on the non-seal surface; and
the seal surface and the circular groove form one continuous surface.

17. A hydrodynamic bearing device according to claim 13, wherein a surface roughness of the non-seal surface is larger than a surface roughness of the seal surface.

18. A spindle motor comprising a hydrodynamic bearing device according to claim 13.

19. A recording and reproduction apparatus comprising a spindle motor according to claim 18.

* * * * *